United States Patent [19]

Goudie

[11] Patent Number: 4,696,042
[45] Date of Patent: Sep. 22, 1987

[54] SYLLABLE BOUNDARY RECOGNITION FROM PHONOLOGICAL LINGUISTIC UNIT STRING DATA

[75] Inventor: Kathleen M. Goudie, Lubbock, Tex.

[73] Assignee: Texas Instruments Incorporated, Dallas, Tex.

[21] Appl. No.: 548,597

[22] Filed: Nov. 3, 1983

[51] Int. Cl.[4] .............................................. G10L 5/00
[52] U.S. Cl. ....................................................... 381/51
[58] Field of Search ..................................... 381/36–53

[56] References Cited

U.S. PATENT DOCUMENTS

| | | | |
|---|---|---|---|
| 4,435,617 | 3/1984 | Griggs | 381/44 |
| 4,454,586 | 6/1984 | Pitz et al. | 364/513.5 |
| 4,473,904 | 9/1984 | Suehiro et al. | 381/36 |

*Primary Examiner*—Gareth D. Shaw
*Assistant Examiner*—John G. Mills
*Attorney, Agent, or Firm*—William E. Hiller; N. Rhys Merrett; Mel Sharp

[57] ABSTRACT

The present invention provides syllable boundaries from a string of phonological linguistic unit indicia and word boundary data. The syllable boundary recognizer places a syllable boundary either at the next following word boundary or prior to the second vowel phonological linguistic unit indicia following the prior syllable boundary based upon the sequence of consonant phonological linguistic unit indicia prior to that second vowel. A permitted syllable initial consonant cluster includes an optional fricative consonant, an optional stop consonant and an optional sonorant consonant. The syllable boundary recognizer searches backward from the second vowel phonological linguistic unit indicia until the permitted sequence is violated, whereupon a syllable boundary is inserted. In the preferred embodiment, a refinement permits certain strong vowel phonological linguistic unit indicia to "capture" the following phonological linguistic unit indicia and shift the syllable boundary. This technique is most useful in low data rate speech systems which provide intonation based upon syllables.

13 Claims, 19 Drawing Figures

SYLLABLE BOUNDARY RECOGNITION FROM PHONOLOGICAL LINGUISTIC UNIT STRING DATA

BACKGROUND OF THE INVENTION

The present invention falls in the category of improvements to low data rate speech apparatuses and may be employed in electronic learning aids, electronic games, computers and small appliances. The problem of low data rate speech apparatuses is to provide electronically produced synthetic speech of modest quality while retaining a low data rate. This low data rate is required in order to reduce the amount of memory needed to store the desired speech or in order to reduce the amount of information which must be transmitted in order to specify the desired speech.

Previous solutions to the problem of providing acceptable quality low data rate speech have employed the technique of storing or transmitting data indicative of the string of phonological linguistic units corresponding to the desired speech. The speech synthesis apparatus would include a memory for storing speech synthesis parameters corresponding to each of these phonological linguistic units. Upon reception of the string of phonological linguistic units, either by recall from a phrase memory or by data transmission, the speech synthesis apparatus would successively recall the speech synthesis parameters corresponding to each phonological linguistic unit indicated, generate the speech corresponding to that unit and repeat. This technique has the advantage that the phonetic memory thus employed need only include the speech parameters for each phonological linguistic unit once, although such phonological linguistic unit may be employed many times in production of a single phrase. The amount of data required to specify one of these phonological linguistic units from among the phonetic library is much less than that required to specify the speech parameters for generation of that particular phonological linguistic unit. Therefore, whether the phrase specifying data is stored in an additional memory or transmitted to the apparatus, an advantageous reduction in the data rate is thus achieved.

This technique has a problem in that the naturalness and intelligibility of the speech thus produced is of a low quality. By recall of speech synthesis parameters corresponding to individual phonological linguistic units occurring in the phrase to be spoken rather than storing the speech synthesis parameters corresponding directly to that phrase, the natural intonation contour of the speech is destroyed. This has the disadvantage of reducing the naturalness and intelligibility of the speech. The naturalness and intelligibility and hence the quality of the speech thus produced may be increased by storing or transmitting an indication of the original, natural intonation contour for intonation control upon synthesis. Storage or transmission of an indication of the natural intonation contour increases the data rate required for specification of a particular phrase or word. Thus, it is highly advantageous to provide a manner of specifying the natural intonation contour at a low bit rate. By combining the technique of specifying phonological linguistic units together with a coded form of the natural intonation contour, a low data rate speech system may be achieved having the required speech quality.

SUMMARY OF THE INVENTION

The object of the present invention is to provide an improvement in the quality of low data rate speech. In the present invention, a low data rate is achieved by encoding spoken input as a series of phonological linguistic units such as phonemes, allophones and diphones, and transmitting indicia corresponding to these phonological linguistic units. In such systems, it may be useful to determine the syllable boundaries of the speech data from the phonological linguistic unit indicia for matching with other data for control of speech contours. The present invention enables such a syllable boundary determination.

In accordance with the principles of the present invention, the phonological linguistic unit indicia are considered to determine where to place syllable boundaries. All the phonological linguistic unit indicia from the previous syllable boundary to either the end of the word or the second following vowel are considered when making the syllable boundary determination. Because it is known that syllable boundaries occur between vowels, the next syllable boundary must occur within this group of phonological linguistic unit indicia. A permitted syllable initial consonant cluster includes an optional fricative consonant, an optional stop consonant and an optional sonorant consonant. The apparatus of the present invention searches backward from the second vowel until the permitted sequence is violated. Once the phonological linguistic unit indicia deviate from this permitted order, the syllable boundary is inserted.

In a refinement of the technique noted above, strong vowels are permitted to "capture" some adjacent phonological linguistic unit indicia and thus vary the boundaries determined by the method noted above. A strong vowel followed by the weak vowel /ER1/ as in "better" or /UHL1/ as in "awful" are treated as a single vowel. Therefore no syllable boundary is placed between these vowels but rather between this combination and the next following vowel. In the case of a plurality of consonants between two vowels, a strong first vowel will "capture" one consonant phonological linguistic unit indicia and bind it to the strong vowel syllable rather than to the following syllable as the technique noted above would require.

BRIEF DESCRIPTION OF THE DRAWINGS

These and other objects of the present invention will become clear from the detailed description of the invention which follows in conjunction with the drawings in which.

DETAILED DESCRIPTION OF THE PREFERRED EMBODIMENTS

The present invention is in the field of low data rate speech, that is speech in which the data required to specify a particular segment of human speech is relatively low. Low data rate speech, if it is of acceptable speech quality, has the advantage of requiring storage or transmission of a relatively low amount of data for specifying a particular set of spoken sounds. One previously employed method for providing low data rate speech is to analyze speech and identify individual phonological linguistic units within a string of speech. Each phonological linguistic unit represents a humanly perceivable sub-element of speech. Once the string of phonological linguistic units corresponding to a given segment of spoken source has been identified, this low bit rate speech technique specifies the speech to be produced by storing or sending a string of indicia corresponding to the string of phonological linguistic units making up that segment of speech.

The specification of speech to be produced in this manner has a disadvantage in that the natural intonation contour of the original spoken input is destroyed. Therefore, the intonation contour of the reproduced speech is wholly artificial. This results in an artificial intonation contour which may be described as choppy or robot like. The provision of such an intonation contour may not be disadvantageous in some applications such as toys or games. However, it is considered advantageous in most applications to provide an approximation of the original intonation contour. The present invention is concerned with techniques for encoding the natural intonation contour for transmission with the phonological linguistic unit indicia in order to specify a more natural-sounding speech.

In the preferred embodiment of the present invention, the speech is produced via linear predictive coding by a single integrated chip designated TMS5220A manufactured by Texas Instruments Incorporated. In linear predictive coding speech synthesis a mathematical model of the human vocal tract, is produced and individual features of the model vocal tract are controlled by changing data called reflection coefficients. This causes the mathematical model to change in analogy to the change in the human vocal tract corresponding to movement of the lips, tongue, teeth, and throat. The TMS5220A integrated circuit speech synthesis device allows independent control of speech pitch via control of the pitch period of an excitation function. In addition, the TMS5220A speech synthesis device permits independent control of speech duration by control of the amount of time assigned for each data frame of speech produced. By independent control of both the pitch and duration of the produced speech, a much more natural intonation contour may be produced.

Figure 1:
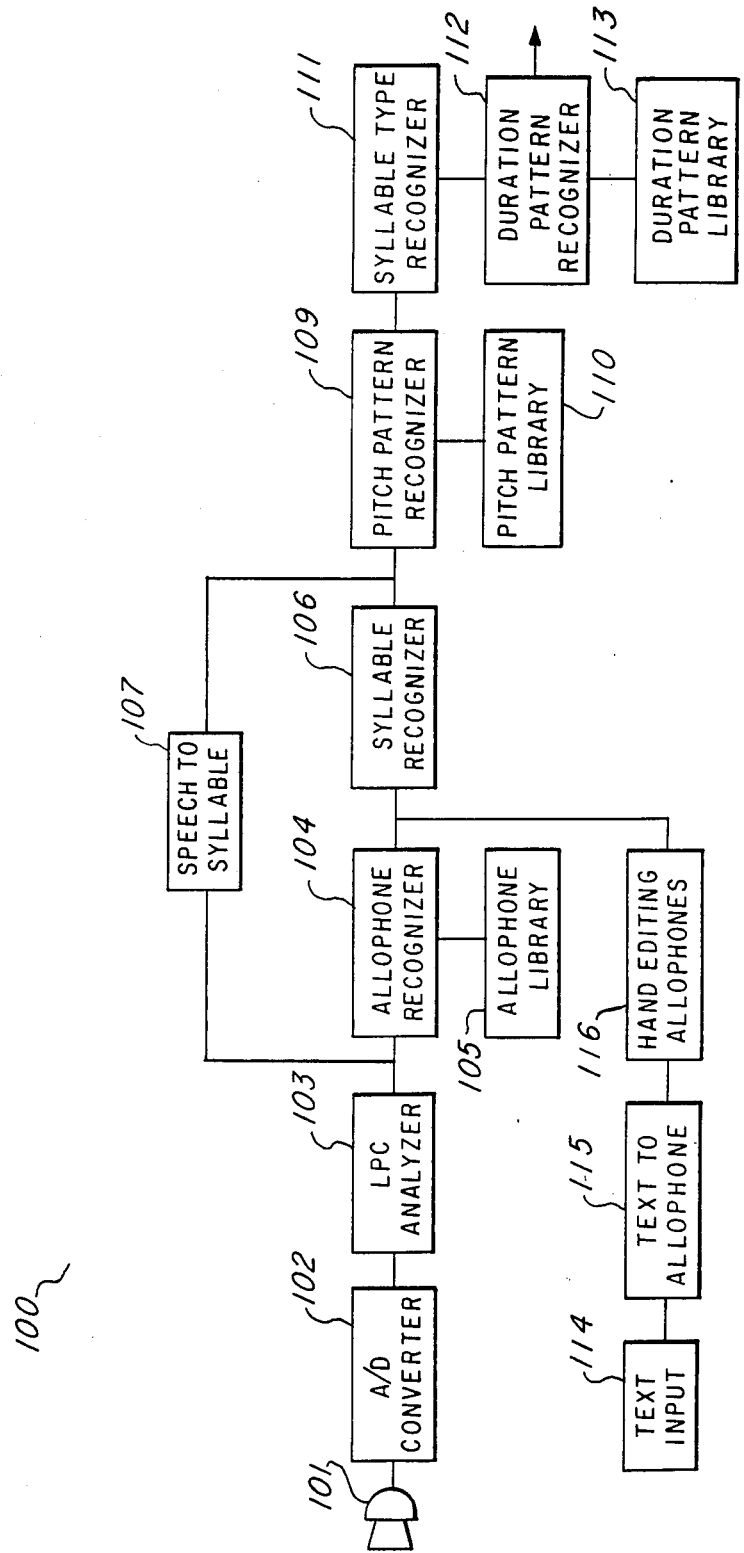
FIG. 1 illustrates a block diagram of the system required to analyze the pitch and duration patterns of specified speech in order to provide the encoding in accordance with the present invention.

FIG. 1 illustrates the encoding apparatus 100 necessary for generating speech parameter data corresponding to spoken or written text input in accordance with the present invention. The output of the encoding apparatus 100 includes a string of indicia corresponding to the phonological linguistic units of the input, a string of pitch pattern indicia selected from a pitch pattern library corresponding to the pitch of the received input and a string of duration pattern indicia selected from among a set of duration patterns within a duration pattern library corresponding to a particular syllable type.

Encoding apparatus 100 includes two alternate input paths, the first via microphone 101 for receiving spoken speech and the second via text input 114 for receiving inputs corresponding to printed text. The speech input channel through microphone 101 will be first described. Microphone 101 receives spoken input and converts this into a varying electrical signal. This varying electrical signal is applied to analog to digital converter 102. In accordance with known principles, analog to digital converter 102 converts the time varying electrical signal generated by a microphone 101 into a set of digital codes indicative of the amplitude of the signal at sampled times. This set of sampled digital code values is applied to LPC analyzer 103. LPC analyzer 103 takes the digital data from analog to digital converter 102 and converts it into linear predictive coding parameters for speech synthesis. LPC analyzer 103 generates an indication of energy, pitch and reflection coefficients for successive time samples of the input data. This set of energy, pitch and reflection coefficient parameters could be employed directly for speech synthesis by the aforementioned TMS5220A speech synthesis device. However, in accordance with the principals of the present invention, these speech parameters are subjected to further analysis in order to reduce the amount of data necessary to specify a particular portion of speech. The present invention operates in accordance with the principals set forth in U.S. Pat. No. 4,398,059 entitled "Speech Producing System" by Kun-Shan Lin, Kathleen M. Goudie, and Gene A. Frantz. In this patent, the speech to be produced is broken up into component allophones. Allophones are variants of phonemes which form the basic elements of spoken speech. Allophones differ from phonemes in that allophones are variants of phonemes depending upon the speech environment within which they occur. For example, the P in "Push" and the P in "Spain" are different allophone variants of the phoneme P. Thus, the use of allophones in speech synthesis enables better control of the transition between adjacent phonological linguistic units. Table 1 lists the allophones employed in the system of the present invention together with an example illustrating the pronunciation of that allophone. The allophones listed in Table 1 are set forth in a variety of categories which will be further explained below.

The energy, pitch and reflection coefficient data from LPC analyzer 103 is applied to allophone recognizer 104. Allophone recognizer 104 matches the received energy, pitch and reflection coefficient data to a set of templates stored in allophone library 105. Allophone library 105 stores energy, pitch and reflection coefficient parameters corresponding to each of the allophones listed in Table 1. Allophone recognizer 104 compares the energy, pitch and reflection coefficient data from LPC analyzer 103 corresponding to the actual speech input to the individual allophone energy, pitch and reflection coefficient parameters stored within allophone library 105. Allophone recognizer 104 then selects a string of allophone indicia which best matches the received data corresponding to the actual spoken speech. Allophone recognizer 104 also produces an indication of the relationship of the duration of the received allophone to the standardized duration of the corresponding allophone data stored in allophone library 105.

The string of allophone indicia from allophone recognizer 104 is then applied to syllable recognizer 106. Syllable recognizer 106 determines the syllable boundaries from the string of allophone indicia from allophone recognizer 104. In accordance with the principles of the present invention, pitch and duration patterns are matched to syllables of the speech to be produced. It has been found that the variation in pitch and duration within smaller elements of speech is relatively minor and that generation of pitch and duration patterns corresponding to syllables results in an adequate speech quality. The output of syllable recognizer 106 determines the boundaries of the syllables within the spoken speech.

Speech encoding apparatus 100 may include a speech to syllable recognizer 107 methods for determining the syllable boundaries within the spoken speech input. Speech to syllable recognizer 107 receives the energy, pitch and reflection coefficient parameters from LPC analyzer 103 and directly generates the syllable boundaries without the necessity for determining allophones as an intermediate step. A further alternative method which may be substituted for the speech to syllable recognizer 107 for determining the syllable boundaries is hand editing. This corresponds to a trained listener who inserts syllable boundaries upon careful observation by listening to the input speech. It will be understood that in the absence of the speech to syllable recognizer 107 or hand editing, the allophone recognizer 104 and the syllable recognizer 106 cooperate in determining the syllable boundaries. In any event, by this point the input speech has been analyzed to determined the energy, pitch, reflection coefficients, allophones and syllable boundaries.

This data, and in particular the pitch and syllable boundary data are applied to pitch pattern recognizer 109. Pitch pattern recognizer 109 encodes the indication of the pitch of the original speech into one of a predetermined set of pitch patterns for each syllable. An indication of these syllable pitch patterns are stored within pitch pattern library 110. Pitch pattern recognizer 109 compares the indication of the actual pitch for each syllable with each of the pitch patterns stored within pitch pattern library 110 and provides an indication of the best match. The output of pitch pattern recognizer 109 is a pitch pattern code corresponding to the best match for the pitch shape of each syllable to the pitch patterns within pitch pattern library 110.

An indication of the pitch patterns stored within pitch pattern library 110 is shown in Table 2. Table 2 identifies each pitch pattern by an identification number, an initial slope, a final slope and a turning point. In accordance with the present invention, the pitch within each syllable is permitted two differing slopes with an adjustable turning point. It should be noted that the slope is restricted within the range of ±2 in the preferred embodiment. Also it should be noted that the preferred speech synthesis device, the TMS5220A, permits independent variation of the pitch period rather than of the pitch frequency. A negative number indicates a reduction in pitch period and therefore an increase in frequency while a positive number indicates an increase in pitch period and therefore a decrease in frequency. In the preferred embodiment, the turning point occurs either at ¼ of the syllable duration, ½ of the syllable duration or ¾ of the syllable duration. Note that no turning point has been listed for those pitch patterns in which the initial slope and the final slope are identical. In such a case there is no need to specify a turning point, since wherever such a turning point occurs, the change in pitch period will be identical. With an allowed group of five initial slopes, five final slopes and three turning points, one would ordinarily expect a total of 75 possible pitch patterns. However, because some of these patterns are redundant, particularly those in which the initial and final slopes are identical, there are only the 53 variations listed. Because of this limitation upon the number of pitch patterns, it is possible to completely specify a particular one of these patterns with only six bits of data.

After the pitch pattern has been selected by pitch pattern recognizer 109, the data is applied to syllable type recognizer 111. Syllable type recognizer 111 classifies each syllable as one of four types depending upon whether or not there are initial or final unvoiced consonant clusters. Syllable type recognizer 111 examines the allophone indicia making up each syllable and determines whether there are any consonant allophone indicia prior to the vowel allophone indicia or any consonant allophone indicia following the vowel allophone indicia which fall within the class of unvoiced consonants. Based upon this determination, the syllable is classified as one of four types.

Duration pattern recognizer 112 receives the syllable type data from syllable type recognizer 111 as well as allophone and duration data. In this regard it should be understood that each allophone may be pronounced in a manner either longer or shorter than the standardized form stored within allophone library 105. As previously noted, allophone recognizer 104 generates data corresponding to a comparison of the duration of the actual allophone data received from LPC analyzer 103 and the standardized allophone data stored within allophone library 105. Based upon this comparison, an allophone duration parameter is derived. The aforementioned TMS5220A speech synthesis device enables production of speech at one of four differing rates covering a four to one time range. Duration pattern library 113 stores a plurality of duration patterns for each of the syllable types determined by syllable type recognizer 111. Each duration pattern within duration pattern library 113 includes a first duration control parameter for any initial consonant allophones, a second duration control parameter for the vowel allophone and a third duration control parameter for any final consonant allophone. The duration pattern recognizer 112 compares the actual duration of speaking for the particular allophone generated by allophone recognizer 104 with each of the duration patterns stored within duration pattern library 113 for the corresponding syllable type. Duration pattern recognizer 112 then determines the best match between the actual duration of the spoken speech and the set of duration patterns corresponding to that syllable type. This best match duration pattern is then output by duration pattern recognizer 112. At the output of duration pattern recognizer 112 is the allophone indicia corresponding to the string of allophones within the spoken input, and the pitch and duration patterns corresponding to each syllable of the spoken input. In addition, duration pattern recognizer 112 may optionally also output some indication of the syllable boundaries.

Elements 114 and 115 illustrate an alternative input to the speech encoding apparatus 100. Text input device 114 receives the input of data corresponding to ordinary printed text in plain language. This text input is applied to text to allophone translator 115 which generates a string of allophone indicia which corresponds to the printed text input. Such a text to allophone conversion may take place in accordance with copending U.S. patent application Ser. No. 240,694 filed Mar. 5, 1981. As an optional further step, hand allophone editing 106 permits a trained operator to edit the allophones from text to allophone converter 115 in order to optimize the allophone string for the desired text input. The allophone string corresponding to the text input is then applied to syllable recognizer 106 where this data is processed as described above.

Figure 2:
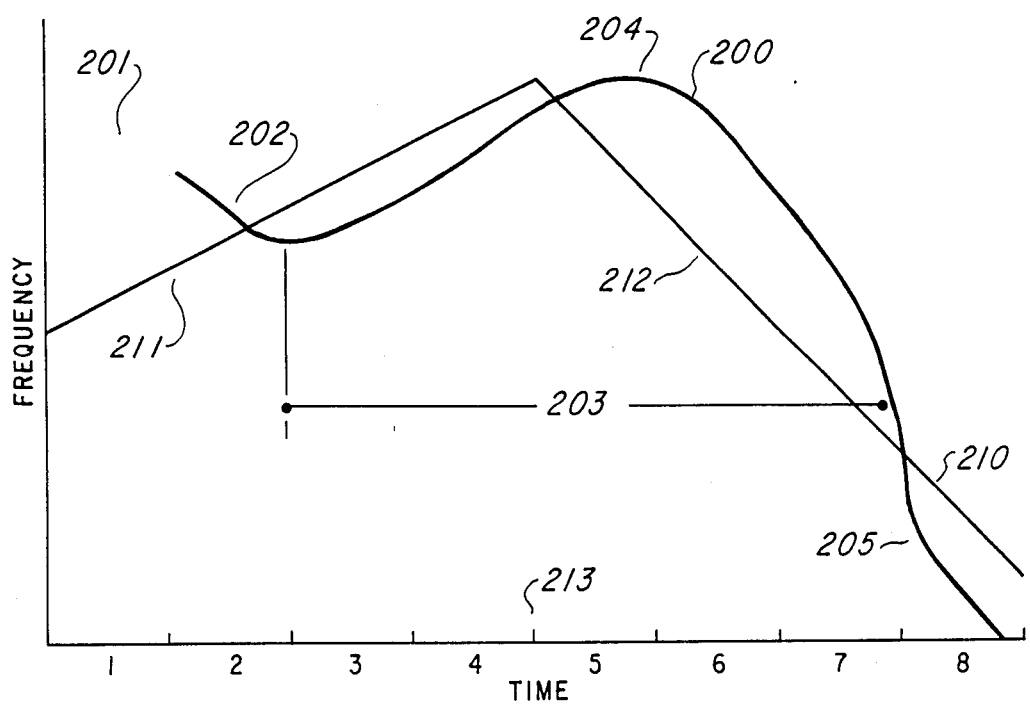
FIG. 2 illustrates an example of a natural pitch contour for a syllable together with the corresponding pitch pattern.

FIG. 2 illustrates an example of hypothetical syllable pitch data together with the corresponding best match pitch pattern. Pitch track 200 corresponds to the actual primary pitch of the hypothetical syllable. During the first part of the syllable 201, the speech is unvoiced, therefore the pitch is set to 0. During a second portion 202, the frequency begins at a level and gradually declines. During a middle portion 203, the frequency gradually rises to a peak at 204 and then declines. During a final portion 205, the decline has a change in slope and becomes more pronounced.

The actual pitch track 200 is approximated by one of the plurality of stored pitch patterns 210. Note pitch pattern 210 has a first portion 211 having an initial upward slope matching the initial portions of speech segment 203. Pitch pattern 210 then has a falling final slope 212 which is a best fit match to the part of speech segment 203 following peak 204 as well as the declining frequency portion 205. Note that the change between the initial slope 211 and the final slope 212 occurs at a time 213, which in this case is ½ the duration of the syllable. Upon resynthesis of the syllable represented by pitch shape 200, the pitch pattern 210 is employed.

Figure 3:
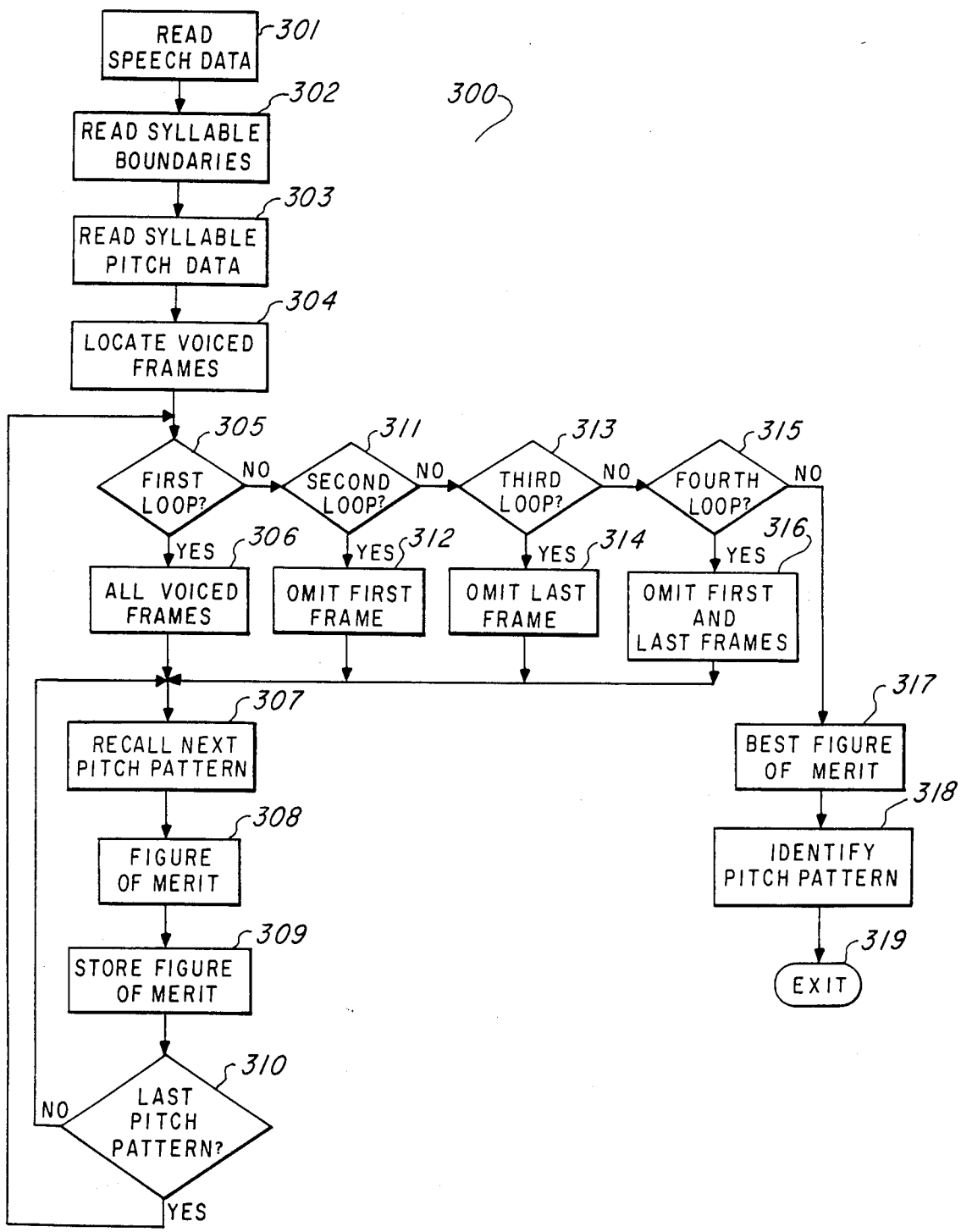
FIG. 3 illustrates a flow chart of the steps required in the pitch pattern analysis in accordance with the present invention.

FIG. 3 illustrates flow chart 300 showing the steps required for determination of the best pitch pattern for a particular syllable. Pitch pattern recognizer 109 preferrably performs the steps illustrated in flow chart 300 in order to generate an optimal pitch pattern for each syllable. In the preferred embodiment, flow chart 300 is performed by a programmed general purpose digital computer. It should be understood that flow chart 300 does not illustrate the exact details of the manner for programming such a general purpose digital computer, but rather only the general outlines of this programming. However, it is submitted that one skilled in the art of programming general purpose digital computers would be able to practice this aspect of the present invention from the flow chart illustrated in 300 once the design choice of the particular general purpose digital computer and the particular applications language has been made. Therefore, the exact operation of the apparatus performing the steps listed in flow chart 300 will not be described in greater detail.

Flow chart 300 starts by reading the speech data (processing block 301) generated by LPC analyzer 103. Program 300 next reads the syllable boundaries (processing block 302) generated by syllable recognizer 106. Program 300 next locates the pitch data corresponding to a particular syllable (processing block 303). Program 300 then locates the segments of data (known as frames) which correspond to voiced speech (processing block 304). In the hypothetical example illustrated in FIG. 2, the syllable includes eight frames, a single initial unvoiced frame and seven following voiced frames. Because speech primary pitch corresponds only to voiced speech, those unvoiced portions of the speech are omitted. It is well known that each syllable includes at least one vowel which is voiced and which may have initial and/or final voiced consonants. The hypothetical example illustrated in FIG. 2 includes an unvoiced portion 201 which corresponds to an unvoiced initial allophone. The remaining portions of the syllable illustrated in FIG. 2 are voiced.

The comparison of the pitch data to the respective pitch shapes occurs in four different loops. Program 300 first tests to determine whether or not the program is in the first loop (decision block 305). If this is true, then the comparison of pitch data to pitch shapes is made on all voiced frames (processing block 306). This comparison is made in a loop including processing blocks 307-309 and decision block 310. Processing block 307 recalls the next pitch shape. A figure of merit corresponding to the amount of similarity between the actual pitch data and the pitch shape is calculated (processing block 308). This figure of merit for the particular pitch shape is then stored in correspondence to that pitch shape (processing block 309). Program 300 then tests to determine whether or not the last pitch shape in the set of pitch shapes has been computed (decision block 310). In the event that the last pitch shape has not been compared then program 300 returns to processing block 307 to repeat this loop. In the event that the last pitch shape within the set of pitch shapes has been compared, then program 300 returns to decision block 305.

Upon subsequent loops, program 300 tests to determine whether or not this is the second loop (decision block 311). If this is the second loop, program 300 causes the comparisons to be made based upon the actual pitch data omitting the first frame of pitch data (processing block 312). Similarly, if it is the third loop as determined by decision block 313, then the comparison is made omitting the last frame of pitch data (processing block 314). Lastly, upon the fourth loop as determined by decision block 315, the pitch shape comparison is made with the pitch data by omitting both the first and the last frames (processing block 316).

After passing through each of the four above-mentioned loops, program 300 locates the best figure of merit previously calculated (processing block 317). Program 300 then identifies the pitch shape which corresponds to this best figure of merit (processing block 318). At this point, program 300 is exited (exit block 319).

Figure 4:
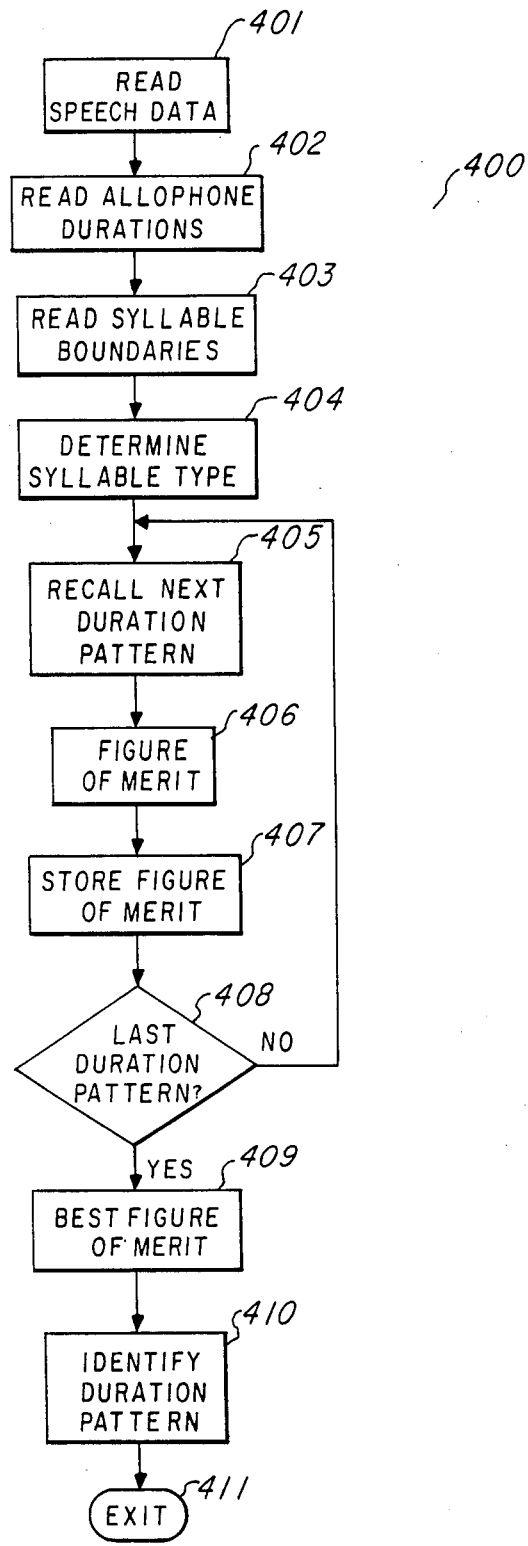
FIG. 4 illustrates a flow chart of the steps required for the duration pattern analysis in accordance with the present invention.

FIG. 4 illustrates program 400 which shows the general steps for performing the duration pattern selection. As explained above in conjunction with FIG. 3, in the preferred embodiment the procedures illustrated in program 400 are executed by a general purpose digital computer. Although program 400 does not describe the detailed steps required for any particular general purpose computer to perform this procedure, it is believed that this description is sufficient to enable one skilled in the art to properly program a general purpose digital computer once the design choice of that computer and that language to be employed has been made.

Program 400 begins by reading the speech data (processing block 401). Program 400 next reads the allophone durations (processing block 402). The allophone durations are generated by allophone recognizer 104 which compares the standard allophone length stored within allophone library 105 with the actual length of the received allophone. Program 400 next reads the syllable boundaries (processing block 403). Program 400 next determines the syllable type (processing block 404). This syllable type determination will be more fully described below in conjunction with FIG. 9.

Program 400 next enters a loop for comparison of the allophone durations with the stored duration patterns. Program 400 first recalls the next duration pattern corresponding to the previously determined syllable type (processing block 405). Program 400 then calculates a figure of merit based upon the comparison of the actual allophone durations with the allophone durations of the duration pattern (processing block 406). This comparison takes place by comparing the relative length of the initial consonant allophones with a first portion of the duration pattern, comparing the relative length of the vowel allophone with a second number of the duration pattern and comparison of the relative duration of any final consonant allophones with the third parameter of the duration pattern. Once this figure of merit has been calculated, it is stored in conjunction with the particular duration pattern (processing block 407). At this point program 400 tests to determine whether the last duration pattern has been compared (decision block 408). If the last duration pattern has not been compared, then program 400 returns to processing block 405 to begin the loop again.

In the event that the comparison has been made for each of the duration patterns of the corresponding syllable type then processing block 409 finds the best figure of merit (processing block 409). Program 400 next identifies the particular duration pattern having the previously discovered greatest figure of merit (processing block 410). This duration pattern is the duration pattern which speech encoding apparatus 100 transmits. At this point program 400 is exited by an exit block 411.

This technique may be used in other manners. As an example it is possible to form speech parameter patterns of speech energy sequences, linear predictive coding reflection coefficients or format frequencies. These type of speech parameters may be matched against prestored patterns in the manner disclosed in regard to pitch and duration. After the best match is found the indicia corresponding to the best speech parameter pattern is identified for transmission to the speech synthesis apparatus. These other speech parameter patterns may be related to other phonological linguistic indicia than the syllables previously disclosed. For example, these other speech parameter patterns may be related to the phonemes, allophones, diphones, demisyllables as well as the syllables disclosed above. As will be further detailed below in relation to pitch and duration patterns, upon synthesis the information of the phonological linguistic unit indicia and the speech pattern indicia are combined to generate the speech.

Figure 5:
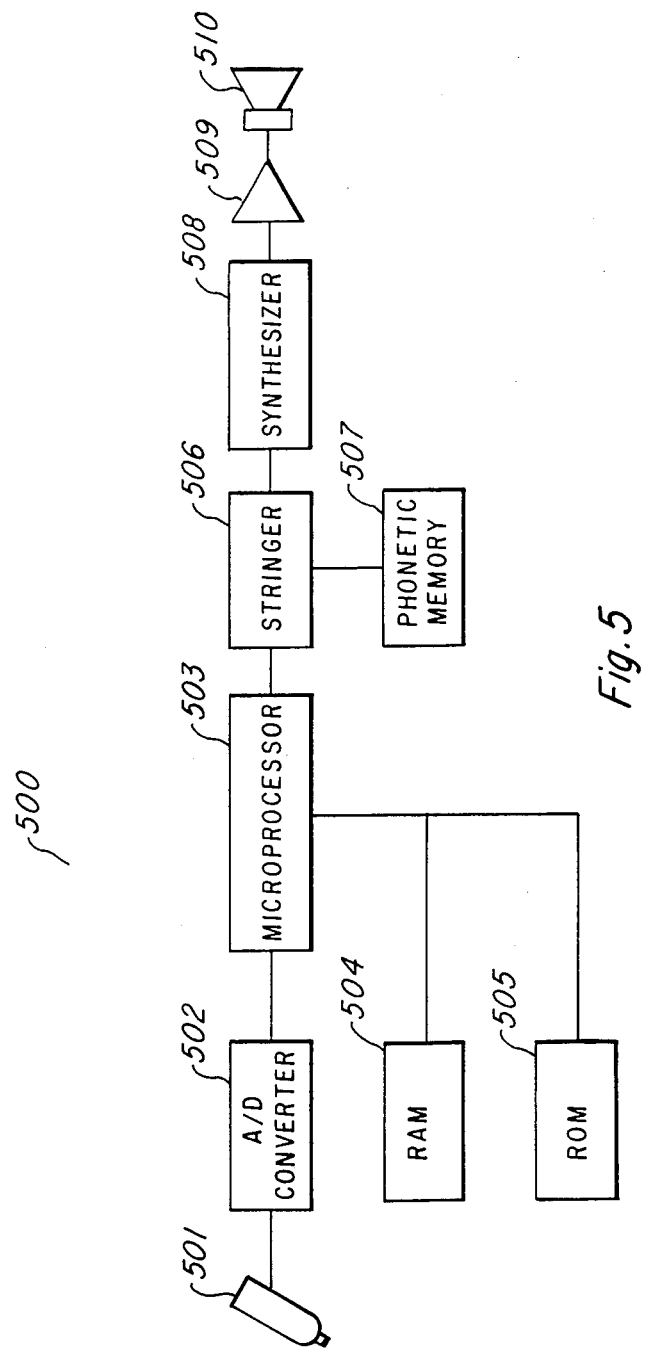
FIG. 5 illustrates an example of a speech synthesis system for production of speech in accordance with the pitch and duration patterns of the present invention.

FIG. 5 illustrates speech producing apparatus 500 in accordance with a preferred embodiment of the present invention. Speech producing apparatus 500 receives input in the form of printed bar code by an optical wand 501. This input data has been encoded in the format described above including allophone indicia, syllable pitch pattern indicia and syllable duration pattern indicia. This data is transmitted to analog to digital converter 502 for conversion into a digital form.

The digital data from analog to digital converter 502 is applied to microprocessor unit 503. Also coupled to microprocessor unit 503 is Random Access Memory 504 and Read Only Memory 505. In accordance with the programming permanently stored within Read Only Memory 505, microprocessor unit 503 identifies the proper allophone indicia and transmits these to stringer 506. In addition, microprocessor unit 503 calculates the proper pitch and duration control parameters from the pitch pattern indicia and the duration pattern indicia. The pitch and duration pattern data are also stored within Read Only Memory 505. Microprocessor unit 503 employes Random Access Memory 504 for storing intermediate values of calculations and for buffering both input and output data.

Stringer 506 combines control data received from microprocessor unit 503 and speech parameters recalled from phonetic memory 507 to generate the speech synthesis parameters for application to synthesizer 508. Phonetic memory 507 includes speech parameters corresponding to each of the permitted allophone indicia. Phonetic memory 507 corresponds substantially to allophone library 105 used as a template for allophone recognizer 104. Stringer 506 recalls the speech parameters from phonetic memory 507 corresponding to received allophone indicia and combines these speech parameters with speech control parameters generated by microprocessor unit 503 in order to control speech synthesizer 508 to generate the desired words.

Speech synthesizer 508 receives the speech parameters from stringer 506 and generates electrical signals corresponding to spoken sounds. These signals are amplified by amplifier 509 and reproduced by speaker 510.

It should be understood that the optical bar code input illustrated in FIG. 5 is merely a preferred embodiment of the use of the present invention. Other forms of input into speaking apparatus 500 may be found advantageous in other applications.

Figure 6A:
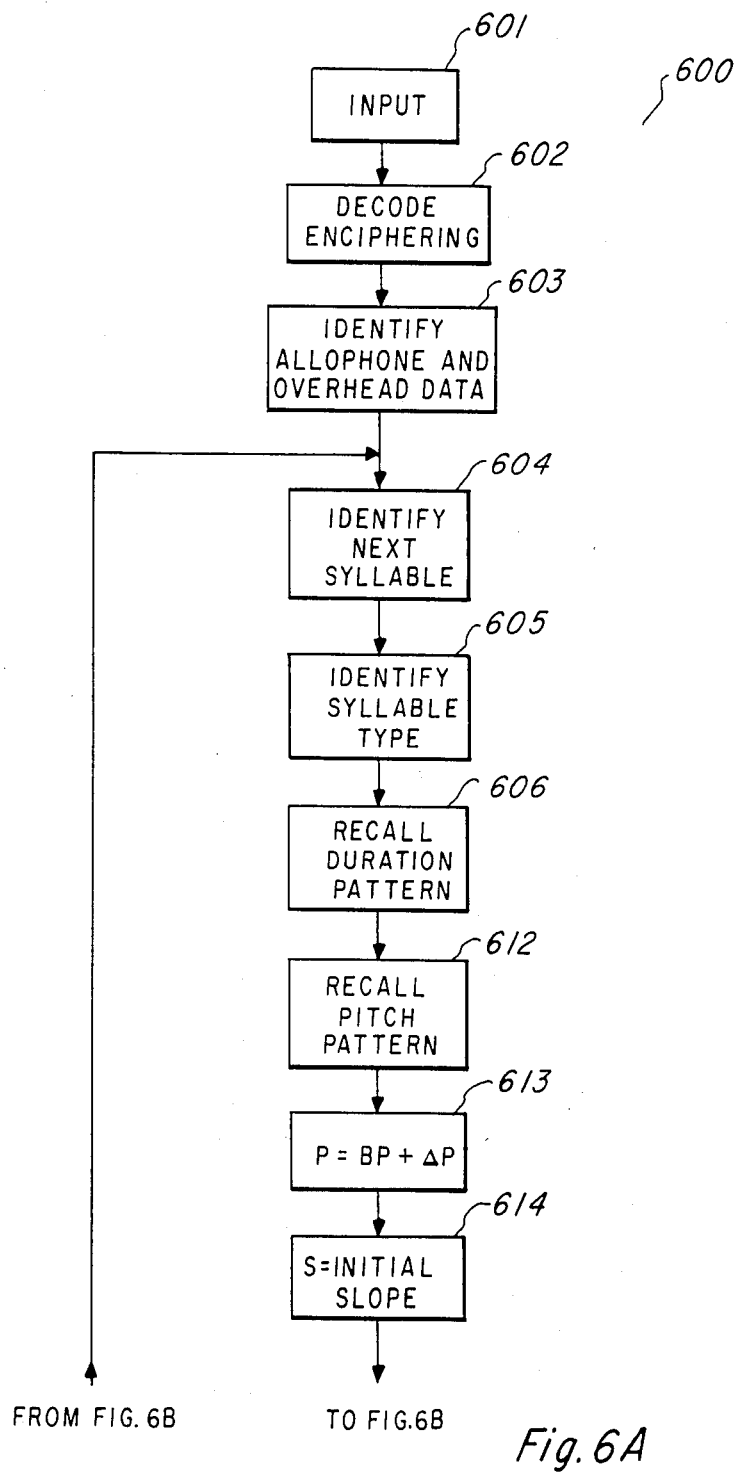
FIGS. 6A and 6B illustrate a flow chart of the steps required for speech synthesis based upon pitch and duration patterns in accordance with the present invention.
Figure 6B:
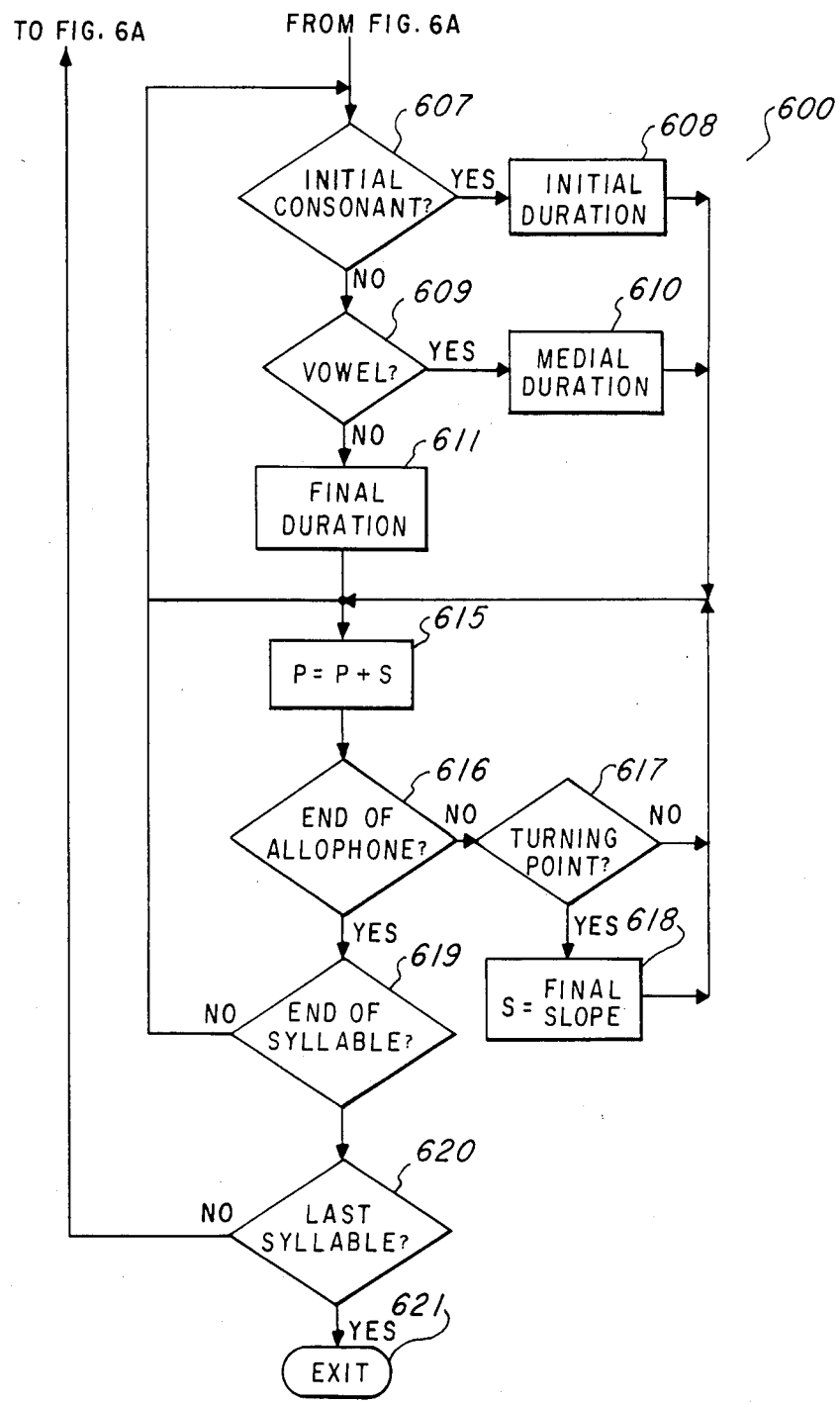

FIG. 6 illustrates program 600 which outlines the major steps required of microprocessor unit 503 in order to generate the proper control parameters for transmission to stringer 506. As in the examples illustrated in FIGS. 3 and 4, program 600 is not intended to illustrate the exact detailed steps required of the microprocessor unit 503, but rather is intended to covey sufficient information to enable one skilled in the art to produce such a detailed program once the selection of the particular microprocessor unit and its associated instruction set is made.

Program 600 starts by input 601 in which microprocessor unit 503 receives the digital data from analog to digital converter 502. Program 600 next deciphers the enciphering of the data received from analog to digital converter 502. In the preferred embodiment, the optical bar code which is read by optical wound 501 is enciphered in some manner to increase its redundancy thereby increasing the possibility of correctly reading of this data. Program 300 next identifies the allophone indicia and the overhead data for later use. The allophone indicia corresponds to the allophones to be spoken by speaking apparatus 500. The overhead data corresponds to such things as the initial pitch, which may be called the base pitch, the permitted pitch range or phrase delta pitch for the particular phrase for control of the expressiveness of the phrase, the word endings, the particular pitch and duration patterns corresponding to each syllable and additional redundancy data such as the number of allophone indicia within the phrase. This data, in particular the pitch pattern data and the duration pattern data corresponding to syllables made up of groups of allophone indicia are employed for generation of speech control parameters for transmission to stringer 506.

Program 600 next identifies the next syllable to be spoken. This identification of the syllable to be spoken may be by means of overhead codes which identify the particular allophone indicia within each syllable. In addition, as will be shown below, microprocessor unit 503 may be programmed in order to determine the syllable boundaries from the types of allophone codes and word boundaries. In any event, program 600 now is concerned with the allophone indicia corresponding to a particular syllable and the overhead data which is employed to control the intonation of that particular syllable. Program 600 then identifies the syllable based upon the presence or absence of any unvoiced initial consonant allophone indicia and unvoiced final consonant allophone indicia. This determination is more clearly illustrated in conjunction with FIG. 9.

Program 600 next selects the particular duration control pattern to be applied to synthesizer 508 during the synthesis of the particular allophone. This is accomplished by recalling the syllable duration pattern (processing block 606) which it should be noted is dependent upon the syllable type. Program 600 next tests to determine whether the next allophone to be spoken is in an initial consonant cluster (decision block 607) and if so assigns the initial duration from the duration pattern to this allophone (processing block 608). If this is not an initial consonant cluster allophone, then program 600 checks to determine whether it is a vowel allophone (decision block 609). If this is the case, then program 600 assigns the medial duration of the duration pattern to this allophone (processing block 610). In the event that the allophone is neither one of the initial consonant allophones nor the vowel allophone, then it must be one of the allophones of the final consonant cluster. In such a case the final duration of the duration pattern is assigned to this allophone (processing block 611).

Program 600 next assigns the pitch to be used in speaking the allophone under consideration. It will be recalled that in the preferred embodiment, synthesizer 508 is embodied by a TMS5220A speech synthesis device available from Texas Instruments Incorporated. This speech synthesis device allows independent control of primary speech pitch by independent control of the pitch period of an excitation function. The following illustrates the manner in which this pitch period is set.

Program 300 first recalls the pitch pattern data corresponding to the particular syllable (processing block 612). As can be seen from a study of Table 2, each particular pitch pattern generally has an initial slope, a final slope and a turning point. As will be more fully understood below, the initial and final slopes enable change of the pitch period of the excitation function of the speech synthesizer 508 during the time that a particular syllable is synthesized.

The pitch period is then set to be equal to the base pitch which is used to determine the register of the voice to be produced and is included within the overhead data, plus the syllable delta pitch, which identifies the change in pitch from the base pitch at the beginning of the syllable and which is also a part of the overhead data (processing block 613). Next, a variable S is set equal to the initial slope of the syllable pitch pattern corresponding to the particular syllable being spoken (processing block 614). At this point the pitch period sent to synthesizer 508 is set equal to the previous pitch period plus the variable S (processing block 615). Program 600 then tests to determine whether the end of an allophone has been reached (decision block 616). If the end of an allophone has not been reached then program 300 tests to determine whether or not the turning point in the pitch pattern has been reached (decision block 617). In the event that the turning point has not been reached then program 600 returns to processing block 615 to again update the pitch period. If the turning point has been reached, then the variable S is changed to the value of the final slope from the pitch pattern (processing block 618) and program 600 returns to update the pitch period based upon this new value of S.

In the event the end of an allophone has been reached then program 600 tests to determine whether the end of a syllable has been reached (processing block 619). If the end of a syllable has not been reached, program 600 returns to decision block 607. Again the initial, medial or final duration is selected depending upon the particular allophone then being produced and the program returns to the pitch assignment in processing block 615. In the event that the end of a syllable has been reached, then program 600 tests to determine whether or not this is the last syllable in a phrase (decision block 620). If the last syllable within the phrase has not been reached, program 600 returns to processing block 604 to determine the next syllable for reproduction and to reinitialize the pitch and duration patterns. On the other hand, if the last syllable of the phrase has been spoken, program 600 is terminated via exit block 621.

Figure 7:
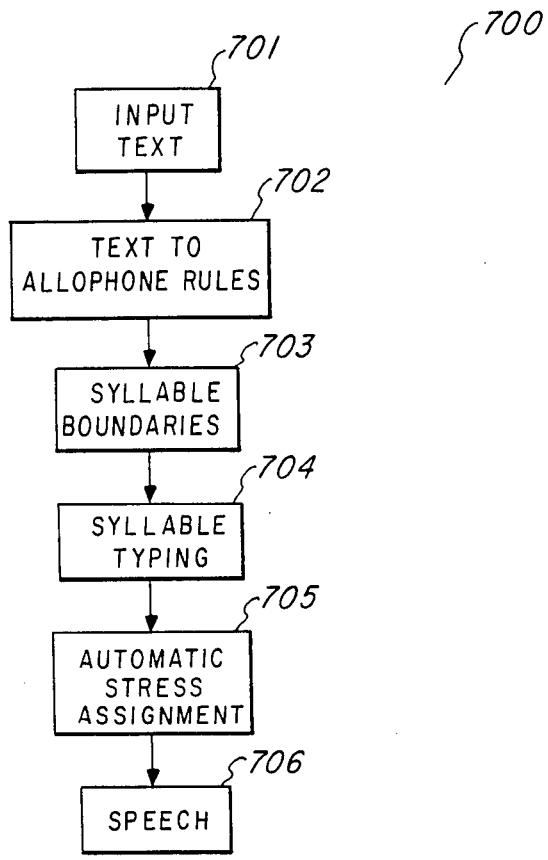
FIG. 7 illustrates a flow chart corresponding to the steps necessary for preprocessing in a text-to-speech embodiment of the present invention.

FIG. 7 illustrates flow chart 700 which shows the preprocessing steps for generating speech from text input. This flow chart is called preprocessing because it occurs before the steps illustrated in program 600.

Firstly, program 700 enters the text (processing block 701). Next this text is reduced to a set of allophones employing text to allophone rules (processing block 702). This process may occur in the manner disclosed in the afore cited U.S. patent application Ser. No. 240,694 filed Mar. 5, 1981. The allophones received from the text to allophone rules together with the word boundaries determined from the input text are then employed to mark the syllables (processing block 703). This process is more clearly disclosed in FIGS. 10A and 10B. Program 700 next determines the syllable type of each of the thus determined syllables (processing block 704). This process is described in greater detail in conjunction with FIG. 9. Program 300 next provides an automatic stress for the phrase (processing block 705). This automatic stress assignment is performed in the manner disclosed in conjunction with FIG. 14. Lastly, program 700 produces the speech (processing block 706) in the manner more fully illustrated in FIGS. 6A and 6B.

Figure 8:
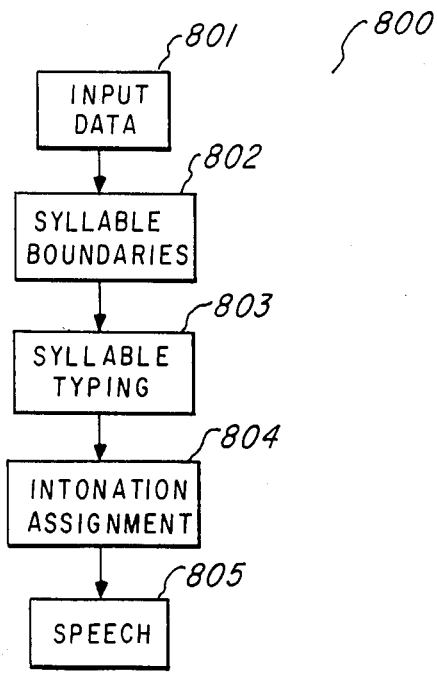
FIG. 8 illustrates the steps for preprocessing and an embodiment of the present invention in which allophone, word boundary and prosody data are transmitted to the speech synthesis apparatus.

FIG. 8 illustrates the preprocessing functions for speech production from a particular type of data. This data type is presently employed in the Magic Wand TM Speaking Reader is more fully described in copending U.S. patent application Ser. Nos. 381,986 and 381,987, both filed May 25, 1982. This particular form of data is preferably embodied in printed bar code and includes allophone indicia, word boundary indicia, base pitch, delta pitch, primary and secondary accent data and rising and falling intonation data. In accordance with the principles of the present invention, this data may be employed to assign syllable pitch patterns for speech synthesis. Program 800 first reads the allophone indicia and overhead data (processing block 801). The allophone indicia and word boundary data is employed to determine type syllable boundaries (processing block 802). As noted above, this procedure is more fully disclosed in conjunction with FIGS. 10A and 10B. Program 800 next determines the syllable types (processing block 803) in the manner previously described. Next program 800 assigns syllable pitch patterns based upon the thus determined syllable boundaries and syllable types and the overhead data (processing block 804). Lastly, program 800 causes speech production (processing block 805) in the manner disclosed in conjunction with FIGS. 6A and 6B.

Figure 9:
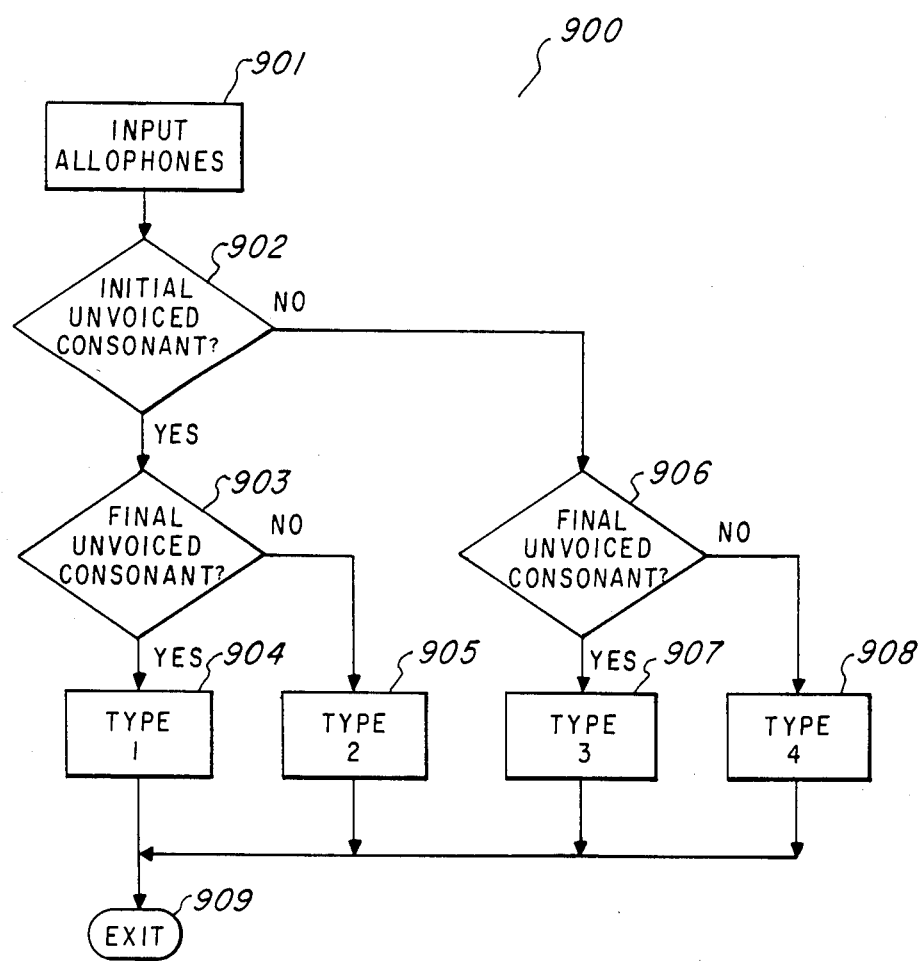
FIG. 9 illustrates the steps required for determining the syllable type from allophone data.

FIG. 9 illustrates program 19 which categorizes individual syllables into one of four types. Program 19 first inputs the allophones corresponding to a particular syllable (processing block 901). Next, program 900 tests to determine the existence of an unvoiced consonant allophone within the initial consonant cluster (decision block 902). If there is such an unvoiced consonant allophone, program 900 next tests to determine the existence of an unvoiced consonant allophone within the final consonant cluster (decision block 903). If there are unvoiced consonant allophones in both initial and final consonant clusters, the syllable is classified as type 1 (processing block 904). If there are unvoiced consonant allophones in the initial consonant cluster but none in the final cluster, then the syllable is classified as type 2 (processing block 905).

In the absence of an initial unvoiced consonant, either by the presence of only voiced consonants or the absence of an initial consonant cluster, program 900 tests to determine whether the syllable includes a final unvoiced consonant allophone (decision block 906). If the syllable is initially voiced and includes a final unvoiced consonant allophone, then it is determined to be type 3 (processing block 907). In the absence of an unvoiced consonant allophone of either the initial consonant cluster or the final consonant cluster, the syllable is determined to be type 4 (processing block 904). Once the determination of the syllable type has been made, then program 900 is terminated by exit block 909.

Figure 10A:
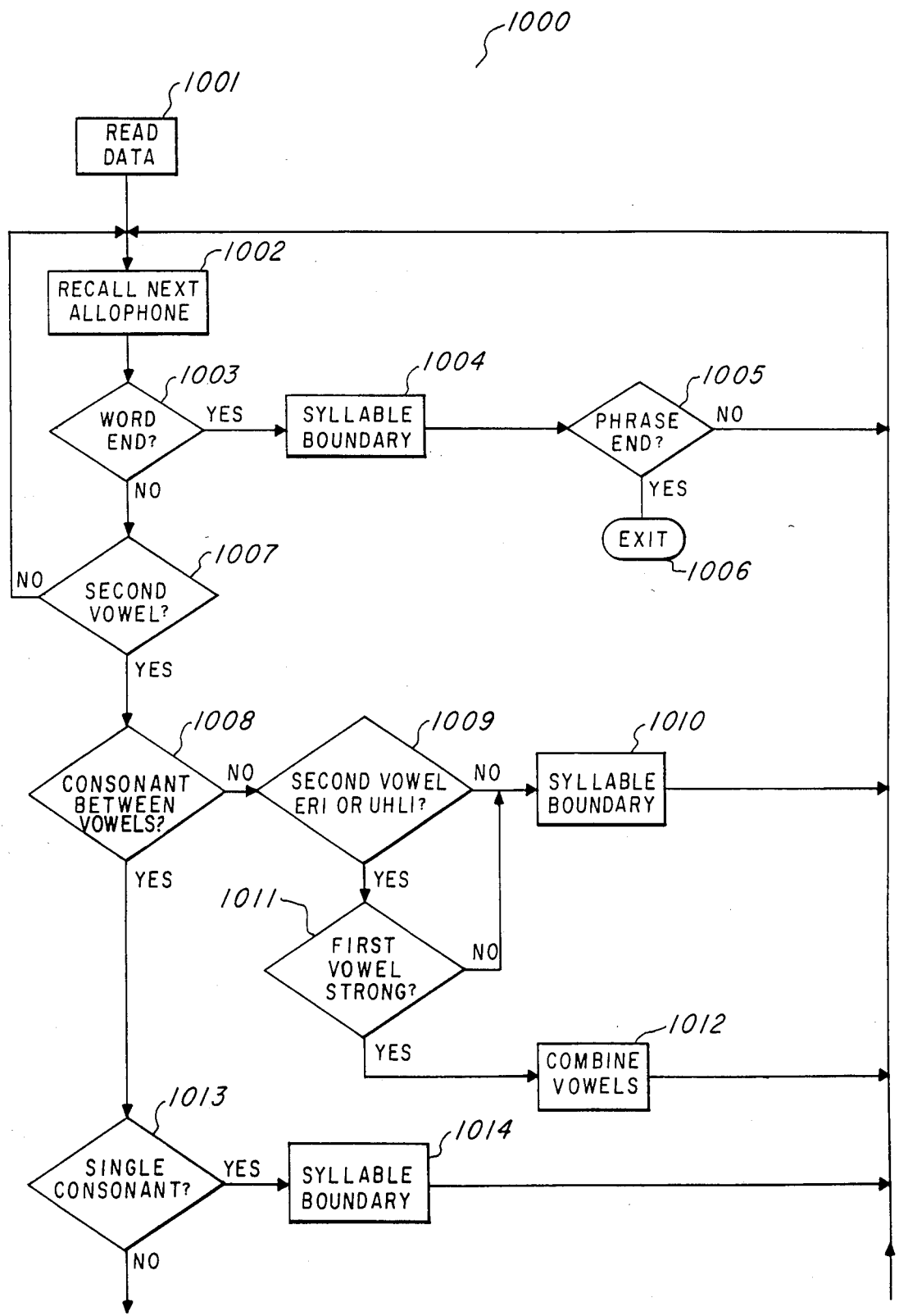
FIGS. 10A and 10B illustrate a flow chart of the steps required for identifying syllable boundaries from allophone and word boundary data.
Figure 10B:
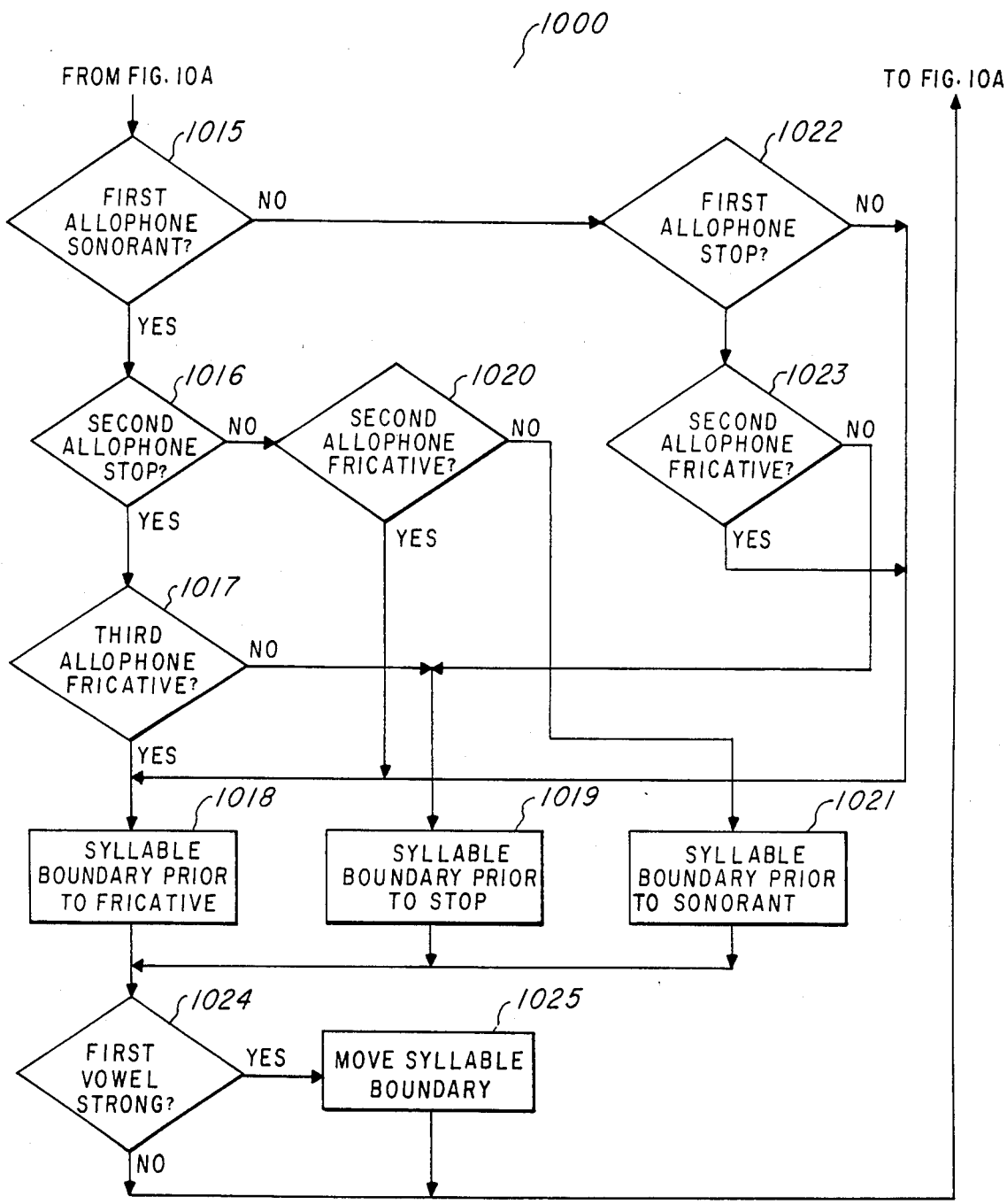
Figure 11:
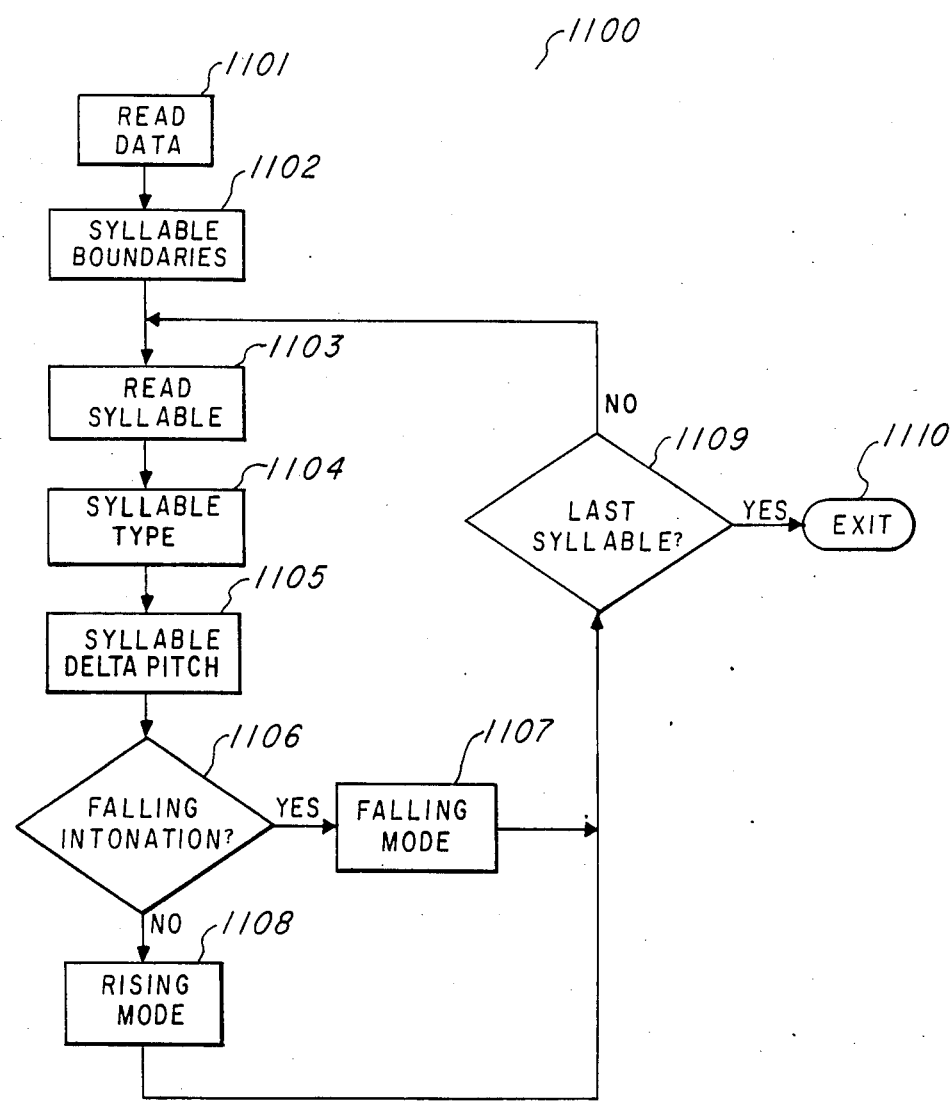
FIG. 11 is a flow chart illustrating the overall steps in a automatic stress analysis technique.

FIGS. 10A and 10B illustrate program 1000 which employs an allophone string with word boundaries in order to insert syllable boundaries. This program has been previously noted in conjunction with FIGS. 7 and 8. As noted above, the syllable boundary determination can be made from input plain language text and text to speech rules which would yield both allophone strings and word boundaries or from the data employed by the Magic Wand TM Speaking Reader which includes allophone indicia and word boundary indicia.

Program 1000 is begun by reading the allophone indicia and word boundary indicia (processing block 1001). Program 1000 then reads the next allophone indicia not previously considered within a syllable (processing block 1002). Program 1000 then checks to determine whether this is a word final allophone (decision block 1003). This determination can be made by the word boundary data previously read. If this allophone is a word final allophone, then program 1000 inserts a syllable boundary following this allophone (processing block 1004) to coincide with the word boundary. Program 1000 next tests to determine whether or not this is the end of the phrase (decision block 1005). If this is not the phrase end, then program 1000 returns to processing block 1002 to read the next allophone indicia to determine the next syllable boundary. In the event that this is the phrase end, then program 1000 is terminated via exit block 1006.

In the event that the previously considered allophone indicia is not a word final allophone, then program 1000 tests to determine whether it is the second vowel following the previous syllable boundary (decision block 1007). If this allophone indicia is not the second following vowel, then program 1000 returns to processing block 1002 to read the next allophone indicia. Syllable boundaries occur between vowels and at word endings. It is assured that the next syllable boundary occurs at either the word end or prior to the second following vowel.

Once all the allophones to the second vowel allophone have been considered, program 1000 tests to determine whether there are any consonant allophone indicia between these two vowel allophone indicia (decision block 1008). In the event that there is no intermediate consonant allophone, then program 1000 tests to determine whether the second vowel is one of two types, namely either a /ER1/ or /UHL1/ vowel allophone indicia (decision block 1009). In the event that the second vowel is neither of these two types, then the syllable boundary is placed between these two vowels (processing block 1010). Control of the program returns to processing block 1002 for insertion of the next syllable boundary. In the event that the second vowel is one of these two specific allophones, then program 1000 tests to determine whether the first vowel is from among the class of strong vowels (decision block 1011). The strong vowels are noted in Table 1. In the event that the first vowel is not a strong vowel, then the syllable boundary is placed between these two vowels (processing block 1010) and the program returns to generate the syllable boundary for the next syllable. If the first syllable is a strong vowel, then these two vowels are combined as one vowel (processing block 1012) and control returns to processing block 1002. In such a case, the two vowels are now considered as one vowel and the program must search for the next following vowel before determining the syllable boundary.

In the event that at least one consonant occurs between the two vowels, program 1000 tests to determine whether there is a single such consonant (decision block

1013). In the event that there is such a single consonant between the two vowels, the program places the syllable boundary between the first vowel and this single consonant (processing block 1014). Program 1000 then returns to processing block 1002 to find the syllable boundary for the next syllable.

In the event that a plurality of consonants are between the two vowels, program 1000 tests to determine whether the consonant immediately prior to the second vowel is a sonorant (decision block 1015). In the event that this allophone is a sonorant, then program 1000 tests to determine whether the second allophone prior to the second vowel is a stop allophone (decision block 1016). In the event that the second vowel is preceded by a stop allophone and a sonorant allophone then program 1000 tests to determine whether the third allophone prior to the second vowel is a fricative (decision block 1017). If this third prior allophone is a fricative then the syllable boundary is placed prior to this fricative allophone (processing block 1018). If this third prior allophone is not a fricative, then the syllable boundary is placed prior to the previously determined stop allophone (processing block 1019).

In the event that the first allophone prior to the second vowel is a sonorant and the second allophone prior to the second vowel is not a stop allophone, the program 1000 tests to determine whether this second prior allophone is a fricative (decision block 1020). If this second prior allophone is a fricative, then the syllable boundary is placed prior to this fricative (processing block 1018). In the event that this second prior allophone is neither a stop nor a fricative, then the syllable boundary is placed immediately prior to the previously noted sonorant (processsing block 1021).

In the event that the allophone immediately prior to the second vowel is not a sonorant, program 1000 tests to determine whether this allophone is a stop (decision block 1022). In the event that this first prior allophone is a stop then program 1000 tests to determine whether the second prior allophone before the second vowel is a fricative (decision block 1023). If the second vowel is immediately preceded by a fricative stop combination, then program 1000 places the syllable boundary prior to this fricative (processing block 1018). In the event that the second vowel is immediately preceded by a stop allophone which is not in turn immediately preceded by a fricative allophone, then program 1000 places the syllable boundary prior to the stop allophone (processing block 1019). In the event that the allophone immediately prior to the second vowel allophone is neither a sonorant nor a stop, then this allophone must be a fricative and the syllable boundary is placed prior to this fricative allophone (processing block 1018).

After the syllable boundary has been determined in this manner program 1000 tests to determine whether the first vowel is one of the class of strong vowels (decision block 1023). Table 1 indicates which vowel allophones are considered strong vowels. In this event the syllable boundary is moved one allophone closer to the second vowel by including that allophone in the syllable of the strong vowel (processing block 1024). In either event control of the program is returned to processing block 1002 in order to determine the next syllable boundary.

The general principle illustrated in program 1000 relates to the permitted initial consonant at the beginning of a syllable. In the event that there are no consonants between the vowels then the syllable boundary must be between those two vowels. If there is a single consonant the syllable boundary is between the first vowel and the consonant. If there are a plurality of consonants between two vowels, then the program tests to determine if the allophones preceding the second vowel are within the permitted class and order for syllable initial allophones. It has been found that a syllable may begin with an optional fricative allophone, an optional stop allophone and an optional sonorant allophone, in that order. In the event that this order is disturbed, then such a combination is not a permitted syllable initial cluster and therefore the syllable boundary must be placed to divide these allophones. As seen in decision blocks 1011 and 1023, a strong vowel has the consequence of "capturing" the following allophone in certain instances. This is because the strong vowel tends to override the importance of the following vowel in capturing the particular adjacent allophone.

Program 11 illustrates the general steps used in a method for controlling syllable pitch including selection of syllable pitch patterns from the data within the bar code of the Magic Wand TM Speaking Reader. As was noted above, this data includes allophone indicia, word boundary indicia, primary accent, secondary accents, a base pitch and the phrase limiting delta pitch, which controls the expressiveness of the phrase. By the use of the previously disclosed syllable pitch patterns, it is possible to provide a more natural and expressive speech from the data previously employed.

Program 1100 begins by reading the allophone indicia and overhead data (processing block 1101). This data is employed to generate the syllable boundaries (processing block 1102).

Program 1100 then enters a loop to determine the syllable delta pitch and the syllable pitch pattern for each syllable. This begins by reading the allophones corresponding to the particular syllable (processing block 1103). Next, the syllable type is determined (processing block 1104) in the manner previously disclosed in conjunction with FIG. 9. Based upon this syllable type, the syllable delta pitch is determined. In the case of syllable types 1 and 2, that is, those beginning in unvoiced consonants, the syllable delta pitch is set by subtracting one (i.e. 1) from the previous delta pitch. It should be noted that this delta pitch is actually the pitch period, which is the variable which may be independently set in the preferred speech synthesis device, the TMS 5220A, and therefore this subtraction results in a higher pitch. In the event that the syllable has a voiced beginning, syllable types 3 and 4, then the beginning delta pitch is the prior delta pitch plus one (i.e. 1) resulting in a lower pitch.

Program 1100 next tests to determine whether the phrase is in falling intonation mode (decision block 1106). The falling intonation mode is employed for most simple declarative sentences. If the phrase is in the falling mode, then the delta pitch and the pitch pattern are assigned according to the falling mode (processing block 1107). This delta pitch and pitch pattern assignment are more fully described below in conjunction with FIG. 12. In the event that the phrase is not in falling intonation mode, then it must be in a rising intonation mode. A rising intonation mode is used most often for questions, exclamations or excited sentences. In such an event, the delta pitch and pitch pattern are assigned in accordance with the rising mode (processing block 1108).

In either event, the program 1100 tests to determine whether the last syllable has an assigned delta pitch and pitch pattern (decision block 1109). In the event that this is not the lat syllable, program 1100 returns to processing block 1103 to reenter the delta pitch and pitch pattern assignment loop. In the event that the prior syllable is the last syllable, then program 1100 is terminated via exit block 1110.

Figure 12A:
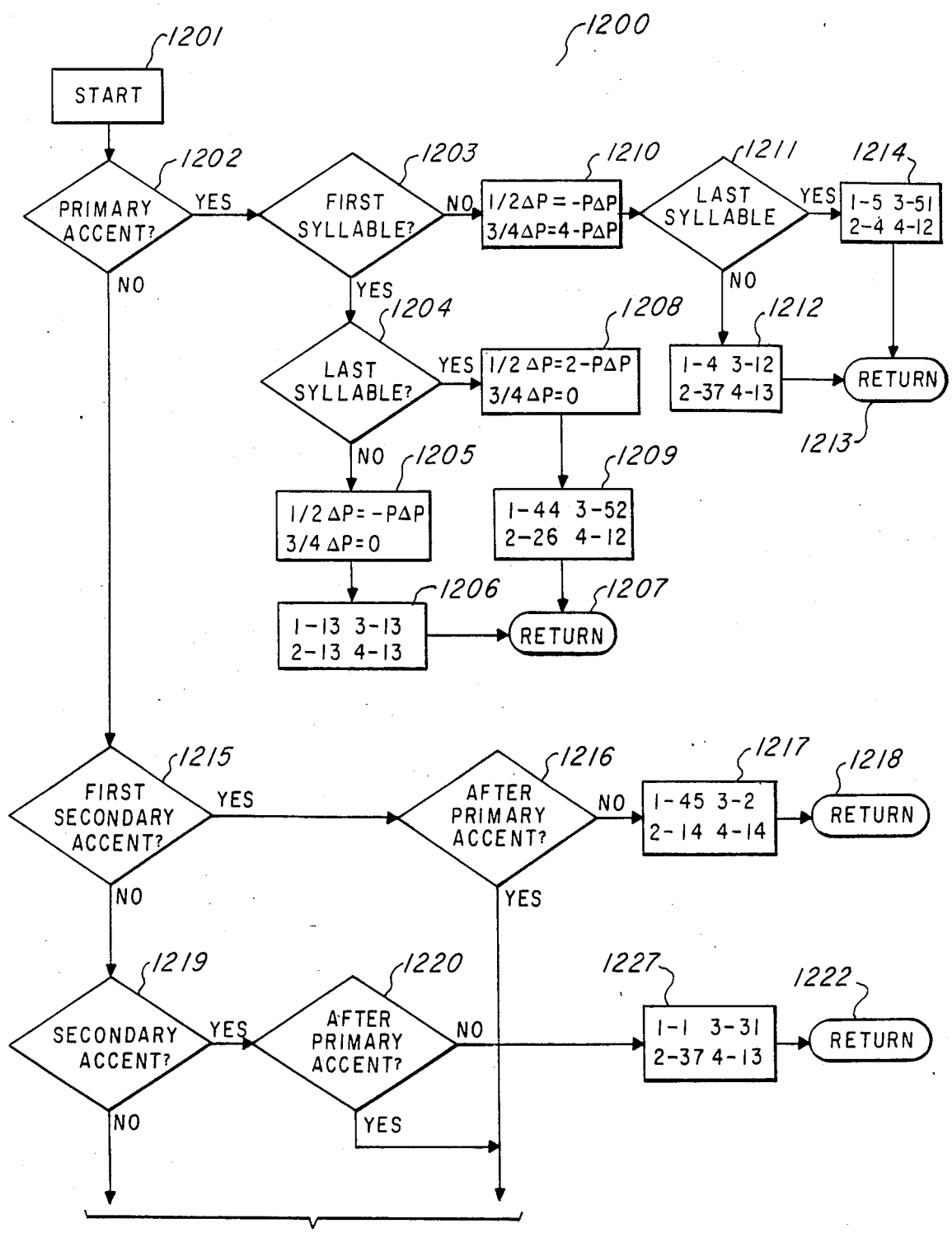
FIGS. 12A and 12B illustrate a flow chart showing the assignment of delta pitch and pitch pattern in the falling intonation mode, which is called as a subroutine of the flow chart illustrated in FIG. 11.
Figure 12B:
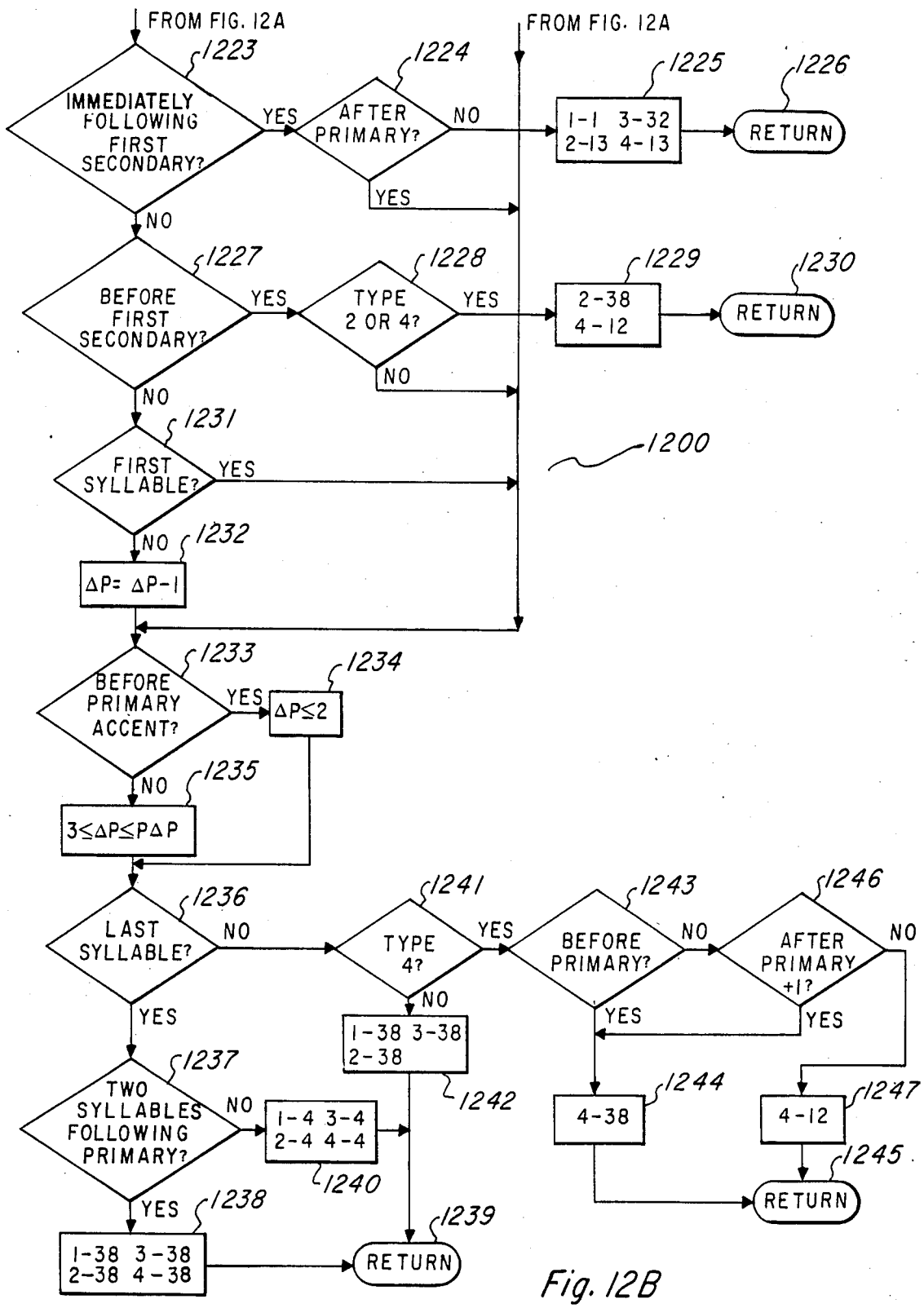

FIGS. 12A and 12B illustrate program 1200 which is called as a subroutine via processing block 1107 in program 1100. Program 1200 assigns the delta pitch and pitch pattern when the phrase is in falling mode. As a general principle, the beginning of a type 1 or type 2 syllable having an unvoiced consonant tends to have a greater frequency than the beginning of a type 3 or type 4 syllable having a voiced beginning. In addition, a syllable of type 2 or type 4 which has a voiced ending tends to be longer and to be assigned a pitch pattern with a smaller slope than a type 1 or type 3 syllable which includes an unvoiced ending.

Program 1200 is entered via entry block 1201. The program first tests to determine whether the syllable has a primary accent within it (decision block 1202). If this is the case, then program 1200 tests to determine whether this is the first syllable in the phrase (decision block 1203). If this syllable is the primary accent and the first syllable in the phrase, it is then tested to determine whether or not it is also the last syllable in the phrase (decision block 1204). In the event that it is not the last syllable in the phrase, then a new delta pitch is assigned based upon syllable type (processing block 1205). If the syllable is of type 1 or 2, then the syllable delta pitch is assigned to be the negative phrase delta pitch. This sets the beginning pitch of this syllable at the highest frequency permitted by the phrase delta pitch. If the syllable is a type 3 or type 4 syllable, then the syllable of the delta pitch is assigned 0 causing the frequency of the beginning of the syllable to be the base pitch. In any event, all syllables are given a pitch shape 13 (processing block 1206). By reference to Table 2 it can be seen that pitch shape 13 has an initial slope of −1, a final slope of +1 and a turning point of ½. Program 1200 is exited via return block 1207 to return to the proper portion of program 1100.

If the syllable is the primary accent syllable and is both the first and the last syllable, then the syllable delta pitch is assigned based upon syllable type (processing block 1208). In this case, if the syllable is type 1 or type 2 the syllable delta pitch is set to two above the negative phrase delta pitch. In the case in which the syllable is type 3 or 4 then the syllable delta pitch is set to 0. Next the pitch shape is assigned by syllable type (processing block 1209). A syllable type 1 is assigned pitch shape 44, syllable type 2 is assigned pitch shape 26, syllable type 3 is assigned pitch shape 52 and syllable type 4 is assigned pitch shape 12. Each of these pitch shapes is a generally falling pitch shape, however, those having a voiced ending are falling at a slower rate because these syllables tend to be longer. After this pitch shape assignment, program 1200 is terminated via return block 1207 to return to the proper place within program 1100.

In the event that that primary accent syllable is not the first syllable in the phrase, then the syllable delta pitch is assigned based upon syllable type (processing block 1210). If the syllable is type 1 or type 2 the syllable delta pitch is set to the minus phrase delta pitch. If the syllable is type 3 or type 4, the syllable delta pitch is set to four levels greater than the base pitch minus the phrase delta pitch. Program 1200 next tests to determine whether this is the last syllable in the phrase (decision block 1211). In the event that this is not the final syllable in the phrase then a type 1 syllable is assigned pitch pattern 4, a type 2 syllable is assigned pitch pattern 37, a type 3 syllable is assigned pitch pattern 12 and a type 4 syllable is assigned pitch pattern 13. These pitch patterns are generally falling but not as steeply as a phrase final primary accent because there are additional syllables in the phrase to carry the intonation down. In the event that this is the final syllable in the phrase, then a type 1 syllable is assigned pitch pattern 5, a type 2 is assigned pitch pattern 4, a type 3 syllable is assigned pitch pattern 51 and a type 4 syllable is assigned pitch pattern 12. In either event, program 1200 is terminated by a return block 1213.

If the syllable is not the primary accent, then program 1200 tests to determine whether it is the first secondary accent (decision block 1215). In such an event, the program 1200 tests to determine whether this first secondary accent is after the primary accent (decision block 1216). If this secondary accent syllable is not following the primary accent, then the pitch shapes are assigned based upon syllable type (processing block 1217). A type 1 syllable is assigned pitch pattern 45, a type 2 syllable is assigned pitch pattern 14, a type 3 syllable is assigned pitch pattern 2 and a type 4 is assigned pitch pattern 14. These are generally rising pitch patterns with the pitch patterns for the unvoiced endings rising relatively faster because these syllbles tend to be shorter. Program 1200 is then terminated via return block 1218. In the event that this secondary accent is after the primary accent, this syllable is demoted to an unstressed syllable and control of the program passes to decision block 1233, which will be more fully described below.

If the syllable is not the first secondary accent syllable, program 1200 tests to determine whether it is a secondary accent (decision block 1219). If this syllable is a secondary accent syllable, program 1200 tests to determine whether this syllable is after the primary accent (decision block 1220). If this secondary accent syllable is not following the primary accent, then pitch shapes are assigned based upon syllable type (processing block 1221). A type 1 syllable is assigned pitch pattern 1, a type 2 syllable is assigned pitch pattern 37, a type 3 syllable is assigned pitch pattern 31 and a type 4 syllable is assigned pitch pattern 13. These pitch patterns are generally level except for the depressive effect upon pitch of voiced consonants. Program 1200 is then terminated by a return block 1222. In the event that this secondary accent follows the primary accent, this secondary accent is demoted to an unstressed syllable and control passes to decision block 1233.

If the syllable is not a primary or a secondary acdent syllable, program 1200 tests to determine whether it is a syllable immediately following the first secondary accent (decision block 1233). In this event program 1200 tests to determine whether this syllable follows the primary accent syllable (decision block 1224). In the event that this syllable does not follow the primary accent syllable, then the pitch pattern is selected based upon syllable type (processing block 1225). A type 1 syllable receives pitch pattern 1, a type 2 syllable receives pitch pattern 13, a type 3 syllable receives pitch pattern 30 and a type 4 syllable receives pitch pattern 13. These pitch patterns are generally level except for the depressive effect of voiced consonants. Program 1200 is then terminated via return block 1226.

If the syllable is an unstressed syllable not immediately following the first secondary accent, program 1200 tests to determine whether it is prior to the first secondary accent (decision block 1227). In such an event program 1200 tests to determine whether it is a type 2 or type 4 syllable (1228). If this is a type 2 or a type 4 syllable, then a pitch pattern is assigned based upon syllable type (processing block 1229). A type 2 syllable is assigned pitch pattern 38 and a type 4 syllable is assigned pitch pattern 12. These pitch patterns show a generally slightly decreasing pitch or increasing pitch. The program is then exited by a return block 1230.

If the syllable is any other unstressed syllable, program 1200 tests to determine whether or not it is the first syllable (decision block 1231). If this is the first syllable, then program 1200 assigns a new syllable delta pitch equal to one less than the previous delta pitch (processing block 1232). In any event, program 1200 next tests to determine whether or not the syllable is before the primary accent (decision block 1233). In either case there is a limit placed upon the syllable delta pitch. If the syllable is before the primary accent, then the syllable delta pitch is not permitted to become greater than 2 (processing block 1234). In the event that the syllable pitch would be greater than 2 according to the other rules the syllable delta pitch is set to 2. In the event that the syllable follows the primary accent, the delta pitch is limited to the range between 3 and the phrase delta pitch inclusive (processing block 1235). This limits the syllable delta pitch of the nuclear contour, that is, that portion of the phrase between the primary accent and the end of the sentence, which for a falling intonation mode, has a pitch period which is generally lengthening.

In either event, program 1200 tests to determine whether this is the last syllable (decision block 1236). In the event that this is the final syllable, then processing block 1237 tests to determine whether or not there are at least two syllables following the primary accent syllable (decision block 1237). In the event that there are at least 2 such syllables, then all syllable types are assigned pitch shape 38 (processing block 1238). This is a level and then slightly falling pitch shape. However, in the event that there are not at least two syllables following the primary accent syllable, each syllable type is assigned pitch pattern 4 (processing block 1240). This is a pitch shape which continually falls at the slow rate. In either event, program 1200 is exited via return block 1239.

If this unstressed syllable is not the final syllable, then program 1200 tests to determine whether or not it is a type 4 syllable (decision block 1241). In the event that it is not a type 4 syllable, then a pitch shape is assigned based upon syllable type (processing block 1242). A type 1 or type 2 syllable is assigned pitch shape 38 and a type 3 syllable is assigned pitch shape 30. Program 1200 is then exited by return block 1239.

If this syllable is a type 4 syllable, then program 1200 checks to determine whether this is before the primary accent (decision block 1243). If this syllable is before the primary accent, then it is assigned pitch shape 38 (processing block 1244) and program 1200 is exited via return block 1245. In the event that this type 4 syllable is not before the primary accent syllable, then program 1200 tests to determine whether or not it immediately follows the primary accent syllable. If the syllable immediately follows the primary accent syllable, it is assigned a pitch shape of 4 (processing block 1247) and program 1200 is exited via return block 1245. If this syllable is not immediately following the primary accent, then it is assigned a pitch shape 38 (processing block 1244) and program 1200 is exited via return block 1245.

Figure 13A:
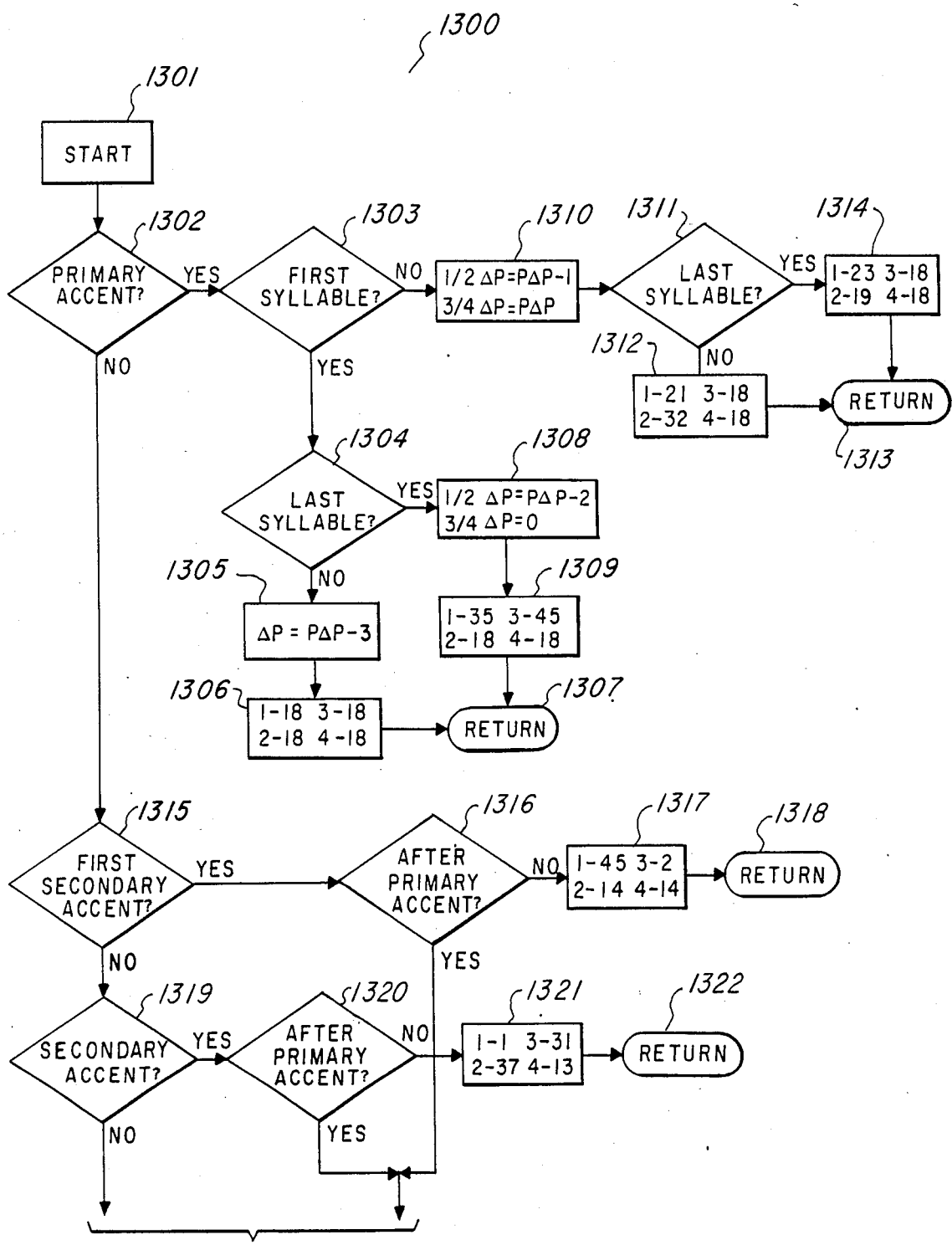
FIGS. 13A and 13B illustrate a flow chart showing the assignment of delta pitch and pitch pattern in a rising intonation mode, which is called as a subroutine of the flow chart illustrated in FIG. 11.
Figure 13B:
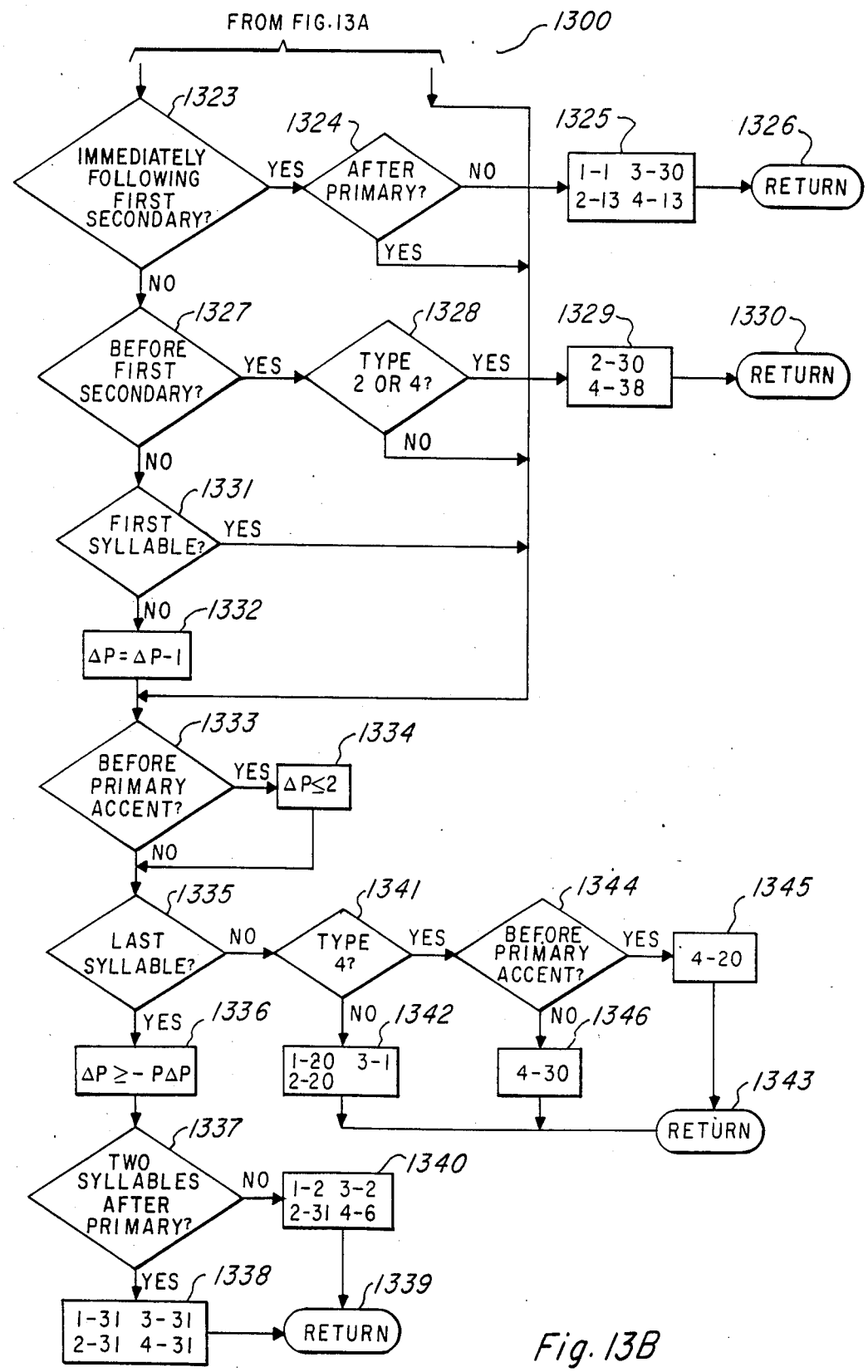

Program 1300 illustrated in FIGS. 13A and 13B illustrates the assignment of syllable delta pitch and pitch patterns in a rising intonation mode. Program 1300 is similar in many aspects to program 1200 illustrated in FIGS. 12A and 12B, except that the syllable delta pitch and pitch patterns assigned by program 1300 differ from those assigned by program 1200.

Program 1300 is entered by enter block 1301. Program 1300 first tests to determine whether the syllable under consideration is a primary accent syllable (decision block 1302). If the syllable under consideration is the primary accent, then program 1300 tests to determine whether or not this is the first syllable in the phrase (decision block 1303). If the syllable under consideration is the primary accent and the first syllable in the phrase, program 1300 tests to determine whether or not this is also the last syllable in the phrase (decision block 1304). If it has been determined that this primary accent is the first syllable but not the last syllable, then a syllable delta pitch is assigned to be the phrase delta pitch minus three (processing block 1305) and pitch patterns are assigned based upon syllable type (processing block 1306). In this case all syllable types receive a pitch pattern 18. Program 1300 is then terminated via return block 1307 to return control of the program to the appropriate point within program 1100.

If a primary accent syllable is both the first and last syllable, the syllable delta pitch is assigned based upon syllable type (processing block 1308). In the case of a type 1 or a type 2 syllable, the syllable delta pitch is set equal to the phrase delta pitch minus two. In the case of a type 3 or a type 4 syllable, the syllable delta pitch is set equal to 0. Next, pitch patterns are selected based upon syllable type (processing block 1309). A type 1 syllable is assigned pitch pattern 35, a type 2 syllable is assigned pitch pattern 18, a type 3 syllable is assigned pitch pattern 45 and a type 4 syllable is assigned pitch pattern 18. Program 1300 is then terminated via return block 1307.

If a primary accent syllable is not the first syllable, then the syllable delta pitch is assigned based upon syllable type (processing block 1310). A type 1 or type 2 syllable is assigned a syllable delta pitch equal to the phrase delta pitch minus one and a type 3 or type 4 syllable is assigned a syllable delta pitch equal to the phrase delta pitch. Program 1300 next tests to determine whether this primary accent syllble is the last syllable in the phrase (decision block 1311). If this is the last syllable in the phrase, then program 1300 assigns pitch patterns based upon syllable type (processing block 1312) so that a type 1 syllable is assigned pitch pattern 21, a type 2 syllable is assigned pitch pattern 32, and a type 3 or type 4 syllable is assigned pitch pattern 18. If this primary accent syllable is neither the first nor the last syllable in the phrase, then program 1300 assigns pitch patterns based upon syllable type (processing block 1314). A type 1 syllable is assigned pitch pattern 23, a type 2 syllable is assigned pitch pattern 19 and a type 3 or type 4 syllable is assigned pitch pattern 18. Program 1300 is then terminated via return block 1313.

If the syllable under consideration is not a primary accent syllable, program 1300 tests to determine whether this is the first secondary accent (decision block 1315). If the syllable under consideration is the first secondary accent, then it is checked to detemine whether it is after the primary accent (decision block 1316). In the event that this first secondary accent syllable is prior to the primary accent, then a pitch pattern is assigned based upon syllable type (processing block 1317). In this case, a type 1 syllable is assigned pitch pattern 45, a type 2 or type 4 syllable is assigned pitch pattern 14 and a type 3 syllable is assigned pitch pattern 2. Program 1300 is then terminated via return block 1318. In the event that this first secondary accent follows the primary accent, then this syllable is demoted to an unstressed syllable. The syllable delta pitch and pitch pattern assignment for set syllables will be more fully explained below.

If the syllable in question is neither the primary accent syllable nor the first secondary accent syllable, program 1300 tests to determine whether it is another secondary accent syllable (decision block 1319). If the syllable is one of the other secondary accent syllables, program 1300 tests to determine whether this syllable is after the primary accent (decision block 1320). If this secondary accent syllable follows the primary accent syllable, then it is demoted to an unstressed syllable. In the event that this secondary accent syllable is prior to the primary accent, then a pitch pattern is assigned based upon syllable type (processing block 1321). In this case, a type 1 syllable is assigned pitch pattern 1, a type 2 syllable is assigned pitch pattern 37, a type 3 syllable is assigned pitch pattern 31 and a type 4 is assigned pitch pattern 13. Program 1300 is then terminated via return block 1322.

If the syllable in question is neither a primary nor a secondary accent syllable, program 1300 tests to determine whether this syllable is immediately following a first secondary accent syllable (decision block 1323). In such an event, program 1300 tests to determine whether or not this syllable follows the primary accent syllable (decision block 1324). If this syllable follows the primary accent syllable, it is demoted to an unstressed syllable whose syllable delta pitch and pitch pattern assignment will be more fully detailed below. If this unstressed syllable immediately following the first secondary accent occurs prior to the primary accent, then the syllable pitch pattern is assigned based upon syllable type (processing block 1325). A type 1 syllable is assigned a pitch pattern of 1, a type 2 syllable is assigned a pitch pattern of 13, a type 3 syllable is assigned a pitch pattern of 30 and a type 4 syllable is assigned a pitch pattern of 13. Program 1300 is then terminated via return block 1326.

It should be noted that the assignment of pitch patterns for the first secondary accent syllable, other secondary accent syllables and unstressed syllables immediately following the first secondary accent which occur prior to the primary accent is the same in the rising intonation mode as previously described in the falling intonation mode.

If the syllable under consideration is unstressed and not immediately following the first secondary accent syllable, program 1300 tests to determine whether or not it is prior to the first secondary accent (decision block 1327). Program 1300 next tests to determine whether or not it is a type 2 or type 4 syllable (decision block 1328) and in such a case a pitch pattern is assigned based upon syllable type (processing block 1329) in which a type 2 syllable is assigned pitch pattern 30 and a type 4 syllable is assigned pitch pattern 38. Program 1300 is then terminated via return block 1330.

If this unstressed syllable is not before the first secondary accent syllable, then it is checked to determine whether it is the first syllable (decision block 1331). If this is not the first syllable, then the syllable delta pitch is set equal to one less than the syllable delta pitch set in processing block 1105 of program 1100 (processing block 1332). In either event or in the event that another type of syllable has been demoted to a unstressed syllable, program 1300 checks to determine whether or not the syllable under consideration is before the primary accent syllable (decision block 1333). If the syllable under consideration is prior to the primary accent syllable, then the delta pitch is limited to be not greater than 2 (processing block 1334). Whether this unstressed syllable is before or after the primary accent, program 1300 tests to determine whether or not it is the last syllable (1335). If this syllable is the last syllable, then the syllable delta pitch is limited to be not less than the inverse of the phrase delta pitch (processing block 1336). Program 1300 tests to determine whether or not there are at least two syllables following the primary accent syllable prior to the end of the phrase (decision block 1337). If there are at least two set syllables then a pitch pattern of 31 is assigned to each syllable type (processing block 1338). Next program 1300 is terminated via return block 1339. However, if there is not at least two syllables following the primary accent syllable before the end of the phrase, then a differing set of syllable pitch patterns are assigned based upon syllable type (processing block 1340). In this case, a type 1 or type 3 syllable is assigned pitch pattern 2, a type 2 syllable is assigned pitch pattern 31 and a type 4 syllable is assigned pitch pattern 6.

In the event that the unstressed syllable is not the last syllable in the phrase, then program 1300 tests to determine whether it is a type 4 syllable (decision block 1341). If this is not a type 4 syllable, then a pitch pattern is assigned based upon syllable type (processing block 1342). If it is a type 1 or a type 2 syllable, it is assigned pitch pattern 20 and if it is a type 3 syllable is is assigned pitch pattern 1. Thereafter, program 1300 is terminated via return block 1343.

If this unstressed nonfinal syllable is a type 4 syllable, program 1300 tests to determine whether or not it is prior to the primary accent (decision block 1344). Pitch pattern 20 is assigned to this syllable if it is prior to the primary accent (processing block 1345) and pitch pattern 30 is assigned to this syllable if it is after the primary accent (processing block 1346). In either event, program 1300 is then terminated via return block 1343.

Figure 14:
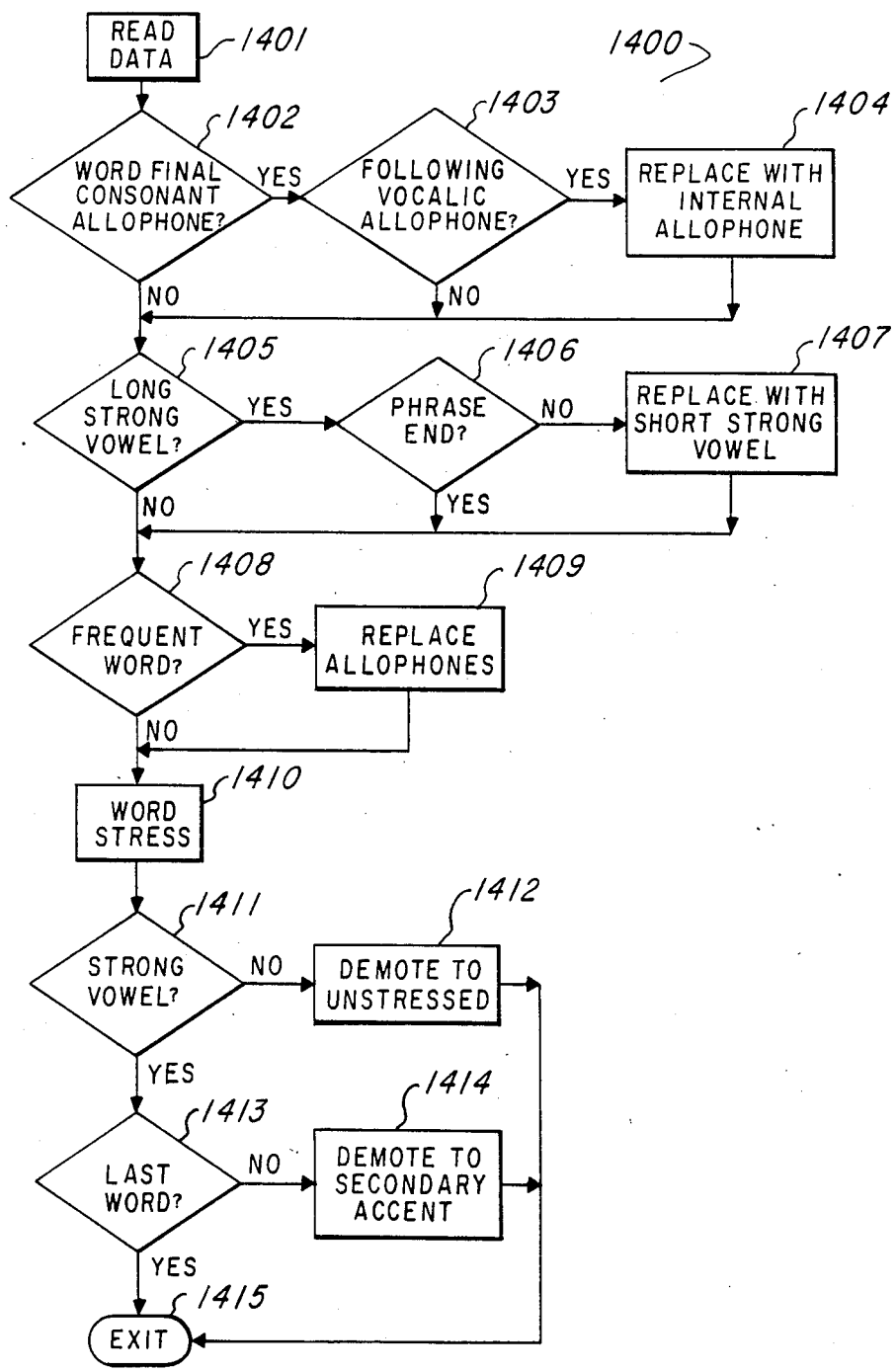
FIG. 14 illustrates the steps for conversion of allophone data from word mode to phrase mode in accordance with another embodiment of the present invention.

FIG. 14 illustrates program 1400 which is employed for converting an allophone set corresponding to a phrase in a clearly articulated and enunciated mode into a mode corresponding to the way a phrase is spoken. This technique is most useful in conjunction with a text-to-allophone conversion such as disclosed in the above cited copending U.S. patent application Ser. No. 240,694. In such text-to-allophone converters, the conversion algorithm often does not take into account the influence of adjacent words upon the enunciation of the word in question.

Program 1400 is begun by reading the allophone and word boundary data (processing block 1401). Program 1400 then searches for a word final consonant allophone (decision block 1402). If such a word final consonant allophone is found, program 1400 tests to determine whether or not the next word has a vocalic allophone at its beginning (decision block 1403). Such a vocalic allophone may be a vowel or a voiced consonant. If such a combination is found, then the word final consonant allophone is replaced with the internal version of the allophone (processing block 1404). If such a combination is not found, then this replacement is not made.

Program 1400 then searches for a long strong vowel (decision block 1405). If such a long strong vowel is found, program 1400 checks to determine whether this is in a phrase ending syllable (decision block 1406). If such a long strong vowel is not in a phrase-ending syllable, then this vowel is replaced by the corresponding short strong vowel (processing block 1407). If such a long strong vowel is at the phrase end, then such replacement is not made.

Program 1400 then checks to locate allophone word boundary combinations corresponding to frequent words such as "a", "and" and "the" (decision block 1408). If such a frequent word has been found, then the allophones corresponding to this word are replaced with allophones from a predetermined set (processing block 1409) which correspond to an internal or phrase type pronunciation of this frequently employed word.

Program 1400 next proceeds to perform a stress assignment based upon the type of vowel allophones within the word in order to determine the primary and secondary stress vowels. This is first performed by performing a word stress assignment (processing block 1410) which will be more fully described below in conjunction with FIG. 15 and in particular 1512 to 1518. This word stress assignment causes a primary accent to fall on one of the vowels of each word.

Program 1400 next tests to determine whether this word has a stress assignment on a strong vowel (decision block 1411). In the event that the stress assignment is not upon a syllable having a strong vowel, then program 1400 demotes this stress in this word to an unstressed syllable (processing block 1412). If the word primary accent has been assigned to a strong vowel syllable, then program 1400 checks to determine whether or not this is the last strong vowel primary accent word in the phrase (decision block 1413). If the word in question is not the last strong vowel primary accent stress word within the phrase, then this stress is demoted to a secondary accent (processing block 1414). If this was the last strong vowel stressed word, then the primary accent is not demoted.

Program 1400 next makes an intonation mode determination (processing block 1415). The ending punctuation, which would be available in a text-to-speech system, may be employed to determine whether to employ a rising or falling intonation mode. A sentence ending in a period would be spoken in a falling intonation mode and a sentence ending in a question mark or an exclamation mark would be spoken in a rising intonation mode. Once this determination of primary and secondary accents and rising or falling intonation mode has been made, pitch patterns can be assigned to the syllables of the phrase in the manner detailed in conjunction with FIGS. 11, 12A, 12B, 13A and 13B. Program 1400 is terminated via exit block 1416.

Figure 15:
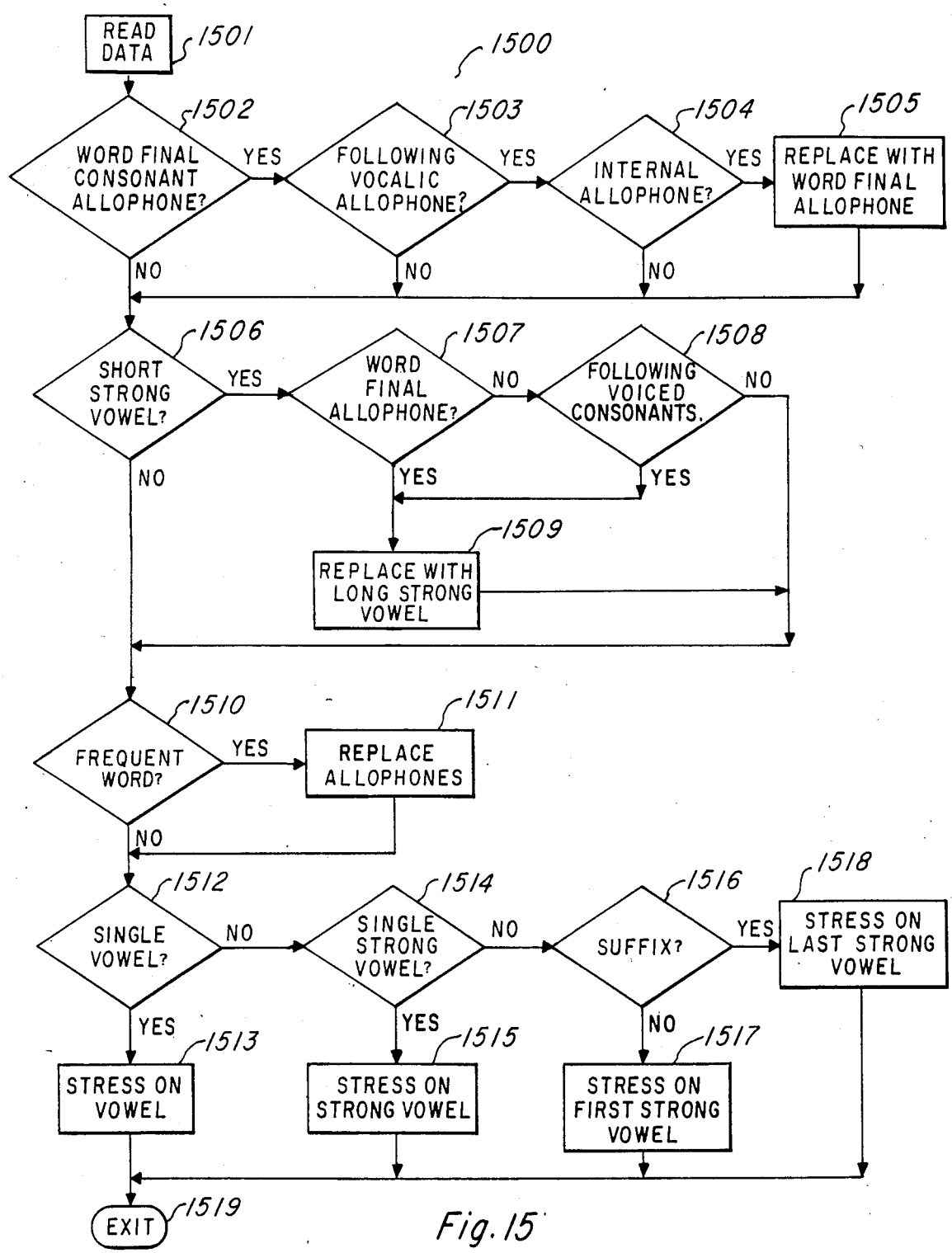
FIG. 15 illustrates the steps for conversion of allophone data specified in a phrase mode into an individual word mode in accordance with a further embodiment of the present invention.

FIG. 15 illustrates program 1300 for converting a word allophone string in a connected or phrased mode into a single word mode in which each syllable is clearly enunciated. This technique is useful in the case of a device such as a Magic Wand TM Speaking Reader which enables reading bar code data in both word and phrase mode. It has been determined that the user will most often activate an entire phrase rather than attempting to read a single word as is permitted by this learning aid. Because of this it is considered advantageous to provide the entire phrase in allophones designed to give a phrase mode pronunciation and to convert these phrase mode pronunciations to individual word mode in the case in which only a single word has been read.

Program 1500 is entered by reading the allophone and word boundary data (processing block 1501). Program 1500 first checks for any word ending consonant allophones (decision block 1502). If such word ending consonant allophones are found, then program 1500 checks to determine whether or not they are followed by a vocalic allophone at the beginning of the next word (decision block 1503). If such a combination is found, then program 1500 checks to determine whether or not this word ending consonant allophone is an internal allophone (decision block 1504). Only in this case is this word ending consonant allophone replaced by the word final version (processing block 1505). In other cases, this allophone is not replaced.

Program 1500 next searches for short strong vowels (decision block 1506). If a short strong vowel is found, then program 1500 tests to determine whether it is a word final allophone (decision block 1307). If it is not a word final allophone, program 1500 additionally checks to determine whether it is followed by all voice consonants to the word ending (decision block 1508). In the event that this short strong vowel is either a word final allophone or followed by all voice consonants to the word end, then this allophone is replaced by the corresponding long strong vowel allophone (processing block 1509). In any other event, this short strong vowel allophone is not replaced.

Program 1500 next checks for allophone strings corresponding to frequent words (decision block 1310). If such frequent word allophone strings are found, they are replaced by corresponding clearly enunciated single word allophone sets corresponding to these frequently used words (processing block 1511).

In either event, program 1500 next assigns a primary stress for pronunciation of this single word. This is accomplished by checking to determine whether this word includes a single vowel allophone (decision block 1512). If this is the case, then the primary stress is placed upon this single vowel allophone (processing block 1513). If the word includes a plurality of vowel allophones, program 1500 checks to determine whether or not there is a single strong vowel allophone (decision block 1514). If this is the case, then the primary stress is placed upon this single strong vowel (processing block 1515).

If there are a plurality of strong vowel allophones, program 1500 checks to determine whether or not there is one of a predetermined group of suffix sets (decision block 1513). If such a suffix does not appear, then the primary stress is placed upon the first strong vowel within the word (processing block 1517). On the other hand, if such a suffix does occur, then the primary stress is placed upon the last strong vowel before the suffix (processing block 1518).

These suffixes shift the primary accent to the last strong vowel prior to the suffix. These suffixes include (1) "ee" as in "employee" /E2 or E3/; (2) "al" as in "equal" /UHL1/ or /UH1 or AH1/L#/; (3) "ion" or "ian" as in "equation" an optional /Y. or E1/ preceeding /UH1N or UH1 or AH1 or Y1N/N# or N-/; (4) "ity", "ities" or "itied" as in equality" /I1/T/Y2/ with an optional following /S# or D#/; (5) "ily", "ilies" or "itied" as in family" /I1/LE/Y2/ with an optional following /S# or D#/; (6) "ogy" as in "biology" /UH1 or AH1/J-/Y2/; (7) "ogist" as in "biologist" /UH1-/J-/Y2/I1/S# or T#/; (8) "ia" as in "indicia" /Y or E1-/AH1 or UH1/; (9) "ic" as in "logic" /I1 or Y1/K1* or KH# or KH1- or KH2-/; (10) "ous" as in "delicious" /AH1 or UH1/S- or S#/. In any event, program 1500 is terminated via exit block 1519.

TABLE 1

ALLOPHONES VOWELS
WEAK VOWELS
AE1 as in ".a.dition"
AH1 as in "delt.a."
AW1 as in ".au.tonomy"
AW1N as in "an.o.nimity"
E1 as in ".e.liminate"
EH1 as in "cont.e.xt"
ER1 as in "seek.er."
I1 as in "synth.e.s.i.s"
OO1 as in "t.oo.k on"
OW1 as in "rati.o."
OW1N as in "d.o.nation"
U1 as in "ann.u.al"
U1N as in ".u.nique"
UH1 as in ".a.bove"
UH1M as in "instr.u.ments"
UH1N as in ".u.nderneath"
UHL1 as in "awf.ul.","we.ll."
Y1 as in "ros.e.s"
Y1N as in "basem.e.nt"
Y2 as in "funn.y."

| SHORT STRONG VOWELS | LONG STRONG VOWELS |
|---|---|
| AE2 as in "hat" | AE3 as in "had" |
| AH2 as in "hot" | AH3 as in "odd" |
| AI2 as in "height" | AI3 as in "hide" |
| AR2 as in "cart" | AR3 as in "card" |
| AU2 as in "house" | AU3 as in "loud" |
| AW2 as in "sought" | AW3 as in "saw" |
| E2 as in "heat" | E3 as in "sed" |
| | EEL- as in "heels" |
| EER2 as in "pierce" | EER3 as in "hear" |
| EH2 as in "set" | EH3 as in "said" |
| EHR2 as in "th.er.apy" | EHR3 as in "there" |
| EI2 as in "take" | EI3 as in "day" |
| ER2 as in "hurt" | ER3 as in "heard" |
| I2 as in ".i.ssue" | I3 as in "hid" |
| ING* as in "think" | |
| | ILL- as in "hills" |
| OI2 as in "choice" | OI3 as in "boy" |
| OO2 as in "cook" | OO3 as in "could" |
| OOR2 as in "poorly" | OOR3 as in "poor" |
| OR2 as in "horse" | OR3 as in "core" |
| OW2 as in "boat" | OW3 as in "low" |
| U2 as in "hut" | U3 as in "shoe" |
| UH2 as in "shoot" | UH3 as in "mud" |
| UU2 as in "boot" | UU3 as in "moon" |
| | UHL- as in "pulls" |
| | ULL- as in "dulls" |

ALLOPHONES CONSONANTS
SONORANTS
L# as in "bowl"
LE as in "let"
M# as in "hum"
M- as in "may"
N# as in "sane"
N- as in "nice"
NG# as in "thing"
NG* as in "think"
R as in "real"
W as in "witch"
WH as in "which"
Y as in "you"

| VOICED STOPS | UNVOICED STOPS |
|---|---|
| B# as in "dab" | K1* as in "skate" |
| B- as in "boy" | KH# as in "make" |
| D# as in "bid" | KH- as in "cup" |
| D- as in "dig" | KH1- as in "key" |

TABLE 1-continued
D1 as in "dinner"
DT* as in "ladder"
G(BK)- as in "go"
G(FR)- as in "give"
G(MD)# as in "bag"

KH2- as in "cough"
P* as in "space"
PH# as in "nap"
PH- as in "pie"
T as in "stake"
TH# as in "late"
TH- as in "tie"

| VOICED FRICATIVES | UNVOICED FRICATIVES |
|---|---|
| THV# as in "clothe" | F# as in "laugh" |
| THV- as in "this" | F- as in "fat" |
| V# as in "live" | HE as in "heat" |
| V- as in "vine" | HI as in "hit" |
| Z# as in "does" | HO as in "home" |
| Z- as in "zoo" | HUH as in "hut" |
| ZH# as in "beige" | S# as in "miss" |
| ZH* as in "azure" | S- as in "seem" |
| | SH# as in "wish" |
| | SH- as in "shine" |
| | THF# as in "cloth" |
| | THF- as in "thing" |

| AFFICATES | STOP-SONORANTS |
|---|---|
| J# as in "budge" | BL as in "blew" |
| J- as in "jug" | BR as in "brew" |
| CH- as in "chime" | |

TRANSITIONS
F-I as in "f.ill"
H-I as in "h.it"
PAUSE

TABLE 2
PITCH PATTERNS

| Number | Initial Slope | Final Slope | Turning Point |
|---|---|---|---|
| 1 | 0 | 0 | — |
| 2 | −1 | −1 | — |
| 3 | −2 | −2 | — |
| 4 | 1 | 1 | — |
| 5 | 2 | 2 | — |
| 6 | 1 | −1 | ¼ |
| 7 | 1 | −1 | ½ |
| 8 | 1 | −1 | ¾ |
| 9 | 2 | −2 | ¼ |
| 10 | 2 | −2 | ½ |
| 11 | 2 | −2 | ¾ |
| 12 | −1 | 1 | ¼ |
| 13 | −1 | 1 | ½ |
| 14 | −1 | 1 | ¾ |
| 15 | −2 | 2 | ¼ |
| 16 | −2 | 2 | ½ |
| 17 | −2 | 2 | ¾ |
| 18 | 0 | −1 | ¼ |
| 19 | 0 | −1 | ½ |
| 20 | 0 | −1 | ¾ |
| 21 | 0 | −2 | ¼ |
| 22 | 0 | −2 | ½ |
| 23 | 0 | −2 | ¾ |
| 24 | 1 | 0 | ¼ |
| 25 | 1 | 0 | ½ |
| 26 | 1 | 0 | ¾ |
| 27 | 2 | 0 | ¼ |
| 28 | 2 | 0 | ½ |
| 29 | 2 | 0 | ¾ |
| 30 | −1 | 0 | ¼ |
| 31 | −1 | 0 | ½ |
| 32 | −1 | 0 | ¾ |
| 33 | −2 | 0 | ¼ |
| 34 | −2 | 0 | ½ |
| 35 | −2 | 0 | ¾ |
| 36 | 0 | 1 | ¼ |
| 37 | 0 | 1 | ½ |
| 38 | 0 | 1 | ¾ |
| 39 | 0 | 2 | ¼ |
| 40 | 0 | 2 | ½ |
| 41 | 0 | 2 | ¾ |
| 42 | 2 | −1 | ¼ |
| 43 | 2 | −1 | ½ |
| 44 | 2 | −1 | ¾ |
| 45 | 1 | −1 | ¼ |
| 46 | 1 | −1 | ½ |
| 47 | 1 | −1 | ¾ |

TABLE 2-continued

PITCH PATTERNS

| Number | Initial Slope | Final Slope | Turning Point |
|---|---|---|---|
| 48 | −2 | 1 | 1/4 |
| 49 | −2 | 1 | 1/2 |
| 50 | −2 | 1 | 3/4 |
| 51 | −1 | 2 | 1/4 |
| 52 | −1 | 2 | 1/2 |
| 53 | −1 | 2 | 3/4 |

I claim:

1. A speech data processing apparatus comprising:
input means for receiving a sequence of input data including a sequence of phonological linguistic unit indicia;
phonetic classifying means connected to said input means for classifying said phonological linguistic unit indicia as a vowel indicia or as one of a plurality of types of consonant indicia;
syllable boundary determining means connected to said input means and said phonetic classifying means for grouping said sequence of phonological linguistic unit indicia into syllables by inserting a syllable boundary between the first and second vowel indicia following the previous syllable boundary at a location depending upon the type of any consonant indicia between said first and second following vowel indicia; and
transmission means connected to said input means and said syllable boundary determining means for transmitting said sequence of phonological linguistic unit indicia and an indication of said syllable boundaries.

2. A speech data processing apparatus as claimed in claim 1, wherein:
said phonological linguistic unit indicia correspond to phonemes.

3. A speech data processing apparatus as claimed in claim 1, wherein:
said phonological linguistic unit indicia correspond to allophones.

4. A speech data processing apparatus as claimed in claim 1, wherein:
said phonological linguistic unit indicia correspond to diphones.

5. A speech data processing apparatus as claimed in claim 1, wherein:
said input means further includes means for receiving an indication of word boundaries corresponding to said sequence of phonological linguistic unit indicia; and
said syllable boundary determining means further includes means for inserting syllable boundaries at locations corresponding to said indication of word boundaries received by said input means.

6. A speech data processing apparatus comprising:
input means for receiving a sequence of input data including a sequence of phonological linguistic unit indicia;
phonetic classifying means connected to said input means for classifying said phonological linguistic unit indicia as a vowel indicia or as one of a plurality of types of consonant indicia, said phonetic classifying means including means for classifying said vowel indicia as /ER1/ (as in better), /UHL1/ (as in awful), a strong vowel indicia or as other vowel indicia;
syllable boundary determining means connected to said input means and said phonetic classifying means for grouping said sequence of phonological linguistic unit indicia into syllables by inserting a syllable boundary between the first and second vowel indicia following the previous syllable boundary at a location depending upon the type of any consonant indicia between said first and second following vowel indicia, said syllable boundary determining means further including means for inserting a syllable boundary between said first and second vowel indicia if there is no consonant indicia therebetween unless the first vowel indicia is a strong vowel indicia and the second vowel indicia is /ER1/ or /UHL1/, whereupon said first and second vowel indicia are combined as a new first vowel indicia and the syllable boundary is placed between said new first vowel indicia and the next following vowel indicia; and
transmission means connected to said input means and said syllable boundary determining means for transmitting said sequence of phonological linguistic unit indicia and an indication of said syllable boundaries.

7. A speech data processing apparatus comprising:
input means for receiving a sequence of input data including a sequence of phonological linguistic unit indicia;
phonetic classifying means connected to said input means for classifying said phonological linguistic unit indicia as a vowel indicia or as one of a plurality of types of consonant indicia;
syllable boundary determining means connected to said input means and said phonetic classifying means for grouping said sequence of phonological linguistic unit indicia into syllables by inserting a syllable boundary between the first and second vowel indicia following the previous syllable boundary at a location depending upon the type of any consonant indicia between said first and second following vowel indicia, said syllable boundary determining means further including means for inserting a syllable boundary between said first vowel indicia and the consonant indicia when there is a single consonant indicia between said first and second vowel indicia; and
transmission means connected to said input means and said syllable boundary determining means for transmitting said sequence of phonological linguistic unit indicia and an indication of said syllable boundaries.

8. A speech data processing apparatus comprising:
input means for receiving a sequence of input data including a sequence of phonological linguistic unit indicia;
phonetic classifying means connected to said input means for classfying said phonological linguistic unit indicia as a vowel indicia or as one of a plurality of types of consonant indicia including fricative consonant indicia, stop consonant indicia, sonorant consonant indicia, or other consonant indicia;
syllable boundary determining means connected to said input means and said phonetic classfying means for grouping said sequence of phonological linguistic unit indicia into syllables by inserting a syllable boundary between the first and second vowel indicia following the previous syllable boundary at a location depending upon the type of any consonant indicia between said first and second following vowel indicia, said syllable boundary determining means further including means for inserting a syllable boundary between the consonant indicia which is the first consonant indicia prior to said second vowel indicia and said second vowel indicia if there are a plurality of consonant indicia between said first and second vowel indicia, unless the first prior consonant indicia is a fricative consonant indicia, a stop consonant indicia or a sonorant consonant indicia.

9. A speech data processing apparatus as claimed in claim 8, wherein:
said syllable boundary determining means further includes means for inserting a syllable boundary between the consonant indicia which is the second consonant indicia prior to said second vowel indicia and said first prior consonant indicia if there are a plurality of consonant indicia between said first and second vowel indicia and said first prior consonant indicia is a sonorant consonant indicia, unless said second prior consonant indicia is a stop consonant indicia or a fricative consonant indicia.

10. A speech data processing apparatus as claimed in claim 9, wherein:
said syllable boundary determining means further includes means for inserting a syllable boundary between the consonant indicia which is the third consonant indicia prior to said second vowel indicia and said second prior consonant indicia if there are a plurality of consonant indicia between said first and second vowel indicia, said first prior consonant indicia is a sonorant and said second prior consonant indicia is a stop, unless said third prior consonant indicia is a fricative consonant indicia and thereupon inserting said syllable boundary between the consonant indicia which is the fourth consonant indicia prior to said second vowel indicia and said third prior consonant indicia.

11. A speech data processing apparatus as claimed in claim 9, wherein:
said syllable boundary determining means further includes means for inserting a syllable boundary between the consonant indicia which is the third consonant indicia prior to said second vowel indicia and said second prior consonant indicia if there are a plurality of consonant indicia between said first and second vowel indicia, said first prior consonant indicia is a sonorant consonant indicia and said second prior consonant indicia is a fricative consonant indicia.

12. A speech data processing apparatus as claimed in claim 8, wherein:
said syllable boundary determining means further includes means for inserting a syllable boundary between the consonant indicia which is the second consonant indicia prior to said second vowel indicia and said first prior consonant indicia if there are a plurality of consonant indicia between said first and second vowel indicia and said first prior consonant indicia is a stop consonant indicia, unless said second prior consonant indicia is a fricative consonant indicia and thereupon inserting a syllable boundary between the consonant indicia which is the third consonant indicia prior to said second vowel indicia and said second prior consonant indicia.

13. A speech data processing apparatus as claimed in claim 8, wherein:
said syllable boundary determining means further includes means for inserting a syllable boundary between said consonant indicia which is the second consonant indicia prior to said second vowel indicia and said first prior consonant indicia if there are a plurality of consonant indicia between said first and second vowel indicia and said first prior consonant indicia is a fricative consonant indicia.

* * * * *